(12) United States Patent
Hirai et al.

(10) Patent No.: US 8,038,908 B2
(45) Date of Patent: Oct. 18, 2011

(54) CARBON NANOTUBE ASSEMBLY AND PROCESS FOR PRODUCING THE SAME

(75) Inventors: Takayoshi Hirai, Nagoya (JP); Hidekazu Nishino, Nagoya (JP); Kenichi Sato, Nagoya (JP); Naoyo Okamoto, Nagoya (JP)

(73) Assignee: TORAY Industries, Inc., Tokyo (JP)

( * ) Notice: Subject to any disclaimer, the term of this patent is extended or adjusted under 35 U.S.C. 154(b) by 0 days.

(21) Appl. No.: 12/734,880

(22) PCT Filed: Aug. 19, 2008

(86) PCT No.: PCT/JP2008/064748
§ 371 (c)(1),
(2), (4) Date: May 28, 2010

(87) PCT Pub. No.: WO2009/069344
PCT Pub. Date: Jun. 4, 2009

(65) Prior Publication Data
US 2010/0301278 A1    Dec. 2, 2010

(30) Foreign Application Priority Data

Nov. 30, 2007 (JP) .................. 2007-311817
Jun. 27, 2008 (JP) .................. 2008-169658

(51) Int. Cl.
*H01B 1/04* (2006.01)
(52) U.S. Cl. ........ 252/502; 252/500; 428/367; 977/752; 977/847; 977/842; 977/932
(58) Field of Classification Search ............... 252/502, 252/500; 428/367; 977/752, 847, 842, 932
See application file for complete search history.

(56) References Cited

U.S. PATENT DOCUMENTS

| 7,060,241 | B2 * | 6/2006 | Glatkowski | 423/447.1 |
| 7,704,482 | B2 * | 4/2010 | Sato et al. | 423/447.3 |
| 2005/0029498 | A1 * | 2/2005 | Elkovitch et al. | 252/500 |
| 2009/0001326 | A1 * | 1/2009 | Sato et al. | 252/511 |

FOREIGN PATENT DOCUMENTS

| EP | 1 977 997 A1 | 10/2008 |
| JP | 2006-11458 | * 4/2006 |
| JP | 2006-269311 A | 10/2006 |
| JP | 2006-335604 A | 12/2006 |
| JP | 2007-197304 A | 8/2007 |
| JP | 2007-197314 A | 8/2007 |
| KR | 10-2004-0030553 A | 4/2004 |
| WO | 2007/074629 A1 | 7/2007 |

OTHER PUBLICATIONS

Yu X., Ramajani R., Stelson K. A., Cui T., "Carbon Nanotube Based Transparent Conductive Thin Films", J. Nanoscience Nanotechnology, Jul. 2006, vol. 6, No. 7, pp. 1939-1944.

Yu X. et al., "Fabrication of carbon nanotube based transparent conductive thin films using layer-by-layer technology", Surface & Coatings Technology 202(2008) pp. 2002-2007 (available online Sep. 7, 2007).

* cited by examiner

Primary Examiner — Douglas Mc Ginty
(74) Attorney, Agent, or Firm — Kubovcik & Kubovcik

(57) ABSTRACT

An aggregate of carbon nanotubes satisfying all of the following requirements (1) to (3):
(1) the volume resistivity is from $1 \times 10^{-5}$ Ω·cm to $5 \times 10^{-3}$ Ω·cm;
(2) at least 50 out of 100 carbon nanotubes are double-walled carbon nanotubes in observation by a transmission electron microscope; and
(3) the weight loss from 200° C. to 400° C. in thermogravimetry at a temperature rise of 10° C/min is from 5% to 20%.

16 Claims, 4 Drawing Sheets

CARBON NANOTUBE ASSEMBLY AND PROCESS FOR PRODUCING THE SAME

The present invention relates to aggregates of carbon nanotubes and a method for producing the same.

BACKGROUND ART

In carbon nanotubes, generally, one with the smaller number of layers has a high graphite structure. Therefore, it has been known that single-walled carbon nanotubes are high in characteristics such as electrical conductivity and heat conductivity. On the other hand, multi-walled carbon nanotubes have a low degree of graphitization, thus it has been also known that they have generally lower electrical conductivity and heat conductivity than single-walled carbon nanotubes. Since double-walled carbon nanotubes have both characteristic of single-walled carbon nanotubes and characteristic of multi-walled carbon nanotubes, there have been drawn attentions as a promising material in various applications.

In recent years, in chemical vapor deposition method (Patent document 1), plasma method (Non-patent document 1), pulse arc method (Patent document 2) and so on, it has been now known that aggregates of carbon nanotubes with high ratio of double-walled carbon nanotubes can be synthesized.

In the aggregates of carbon nanotubes produced, catalyst metal and impurities other than carbon nanotubes such as amorphous carbon and particulate carbon are mixed, and thus in order to bring out an intrinsic characteristic of carbon nanotubes sufficiently, an operation to remove the catalyst metal and carbon impurities becomes necessary.

For removing carbon impurities, generally a heating method in a gas phase is often used. For removing catalyst metal, it is common to use an acid. Although using a strong acid makes removal of catalyst metal easy, in the case of using a strong acid, carbon nanotubes are damaged and the characteristic deteriorates. Thus, practically it is necessary to use an acid having a relatively mild reactivity as an acid to be used for removal of catalyst metal. Non-patent document 2 describes that when single-walled carbon nanotubes are treated in a nitric acid solution, functionalization and defect of graphite structure take place. Non-patent document 3 denotes that when heating of multi-walled carbon nanotubes is continued, functionalization proceeds, G/D ratio in a Raman spectrum being one index showing a purity of carbon nanotubes is lowered. In a method shown concretely in Patent document 1, it is also reported that layers more than 20 layers are removed with nitric acid (which is understand on the basis of calculation from the average diameter before and after treatment, provided that interlayer distance of a carbon nanotube is 0.34 nm).

When removal of catalyst metal is only purpose, any acid which dissolves catalyst metal may be used, in general, when an acid such as nitric acid or a mixed acid of nitric acid with sulfuric acid is used, there is a fear that the surface of a carbon nanotube is functionalized, thus from the above-described reason, practically when the metal can be removed with hydrochloric acid, it is very often to use hydrochloric acid. In particular, in the case of a single-walled carbon nanotube, a graphite layer is constituted by only one layer, thus it comes under the notable influence of functionalization.

In order to increase electrical conductivity as the aggregate of carbon nanotubes, there have been devised a method that high conductive metallic carbon nanotubes are separated from semiconductive carbon nanotubes by electrocataphoresis, a synthesis method that metallic carbon nanotubes become major in a synthesis stage and the like, but they are techniques hardly applicable to carbon nanotubes with the number of layers of 2 or more, and the present situation is that double-walled carbon nanotubes having both merits of single-walled and multi-walled ones have not been obtained.

Patent document 1; Japanese Unexamined Patent Publication No. 2006-335604
Patent document 2; Japanese Unexamined Patent Publication No. 2004-168647
Patent document 3; Japanese Unexamined Patent Publication No. 2005-154200
Non-patent document 1: Journal of Physical Chemistry B, 107(2003), 8794-8798
Non-patent document 2: Journal of American Chemistry Society, 126(2004), 6095-6105
Non-patent document 3: Carbon 43(2005), 3124-3131

DISCLOSURE OF THE INVENTION

Problems to be Solved by the Invention

In the light of the above, it is an object of the present invention to provide aggregates of carbon nanotubes with high electrical conductivity and a method for producing the aggregates of carbon nanotubes easily with high yield.

Means to Solve the Problems

The present inventors studied keenly, as a result, have found that by treating an aggregate of double-walled carbon nanotubes with a high degree of graphitization using a nitric acid solution, an aggregate of carbon nanotubes including double-walled carbon nanotubes with high electrical conductivity is obtained.

Namely, the present invention is an aggregate of carbon nanotubes satisfying all the following requirements (1) to (3):
(1) the volume resistivity is from $1 \times 10^{-5}$ Ω·cm to $5 \times 10^{-3}$ Ω·cm;
(2) at least 50 of 100 carbon nanotubes are double-walled carbon nanotubes in observation by a transmission electron microscope; and
(3) the weight loss from 200° C. to 400° C. in thermogravimetry at g temperature rise of 10° C./min is from 5% to 20%.

The present invention is also a method for producing the above aggregate of carbon nanotubes by heating an aggregate of double-walled carbon nanotubes of 20 or more in the height ratio of G band to D band (G/D ratio) by Raman spectroscopic analysis of wavelength 633 nm in a nitric acid solution.

Effect of the Invention

By using the aggregate of carbon nanotubes with excellent electrical conductivity of the present invention, a film having excellent light transmittance and surface resistance is obtained.

According to the production method of the present invention, aggregates of carbon nanotubes with high electrical conductivity are obtained easily with high yield.

DESCRIPTION OF NUMBER AND SYMBOL

Figure 1:
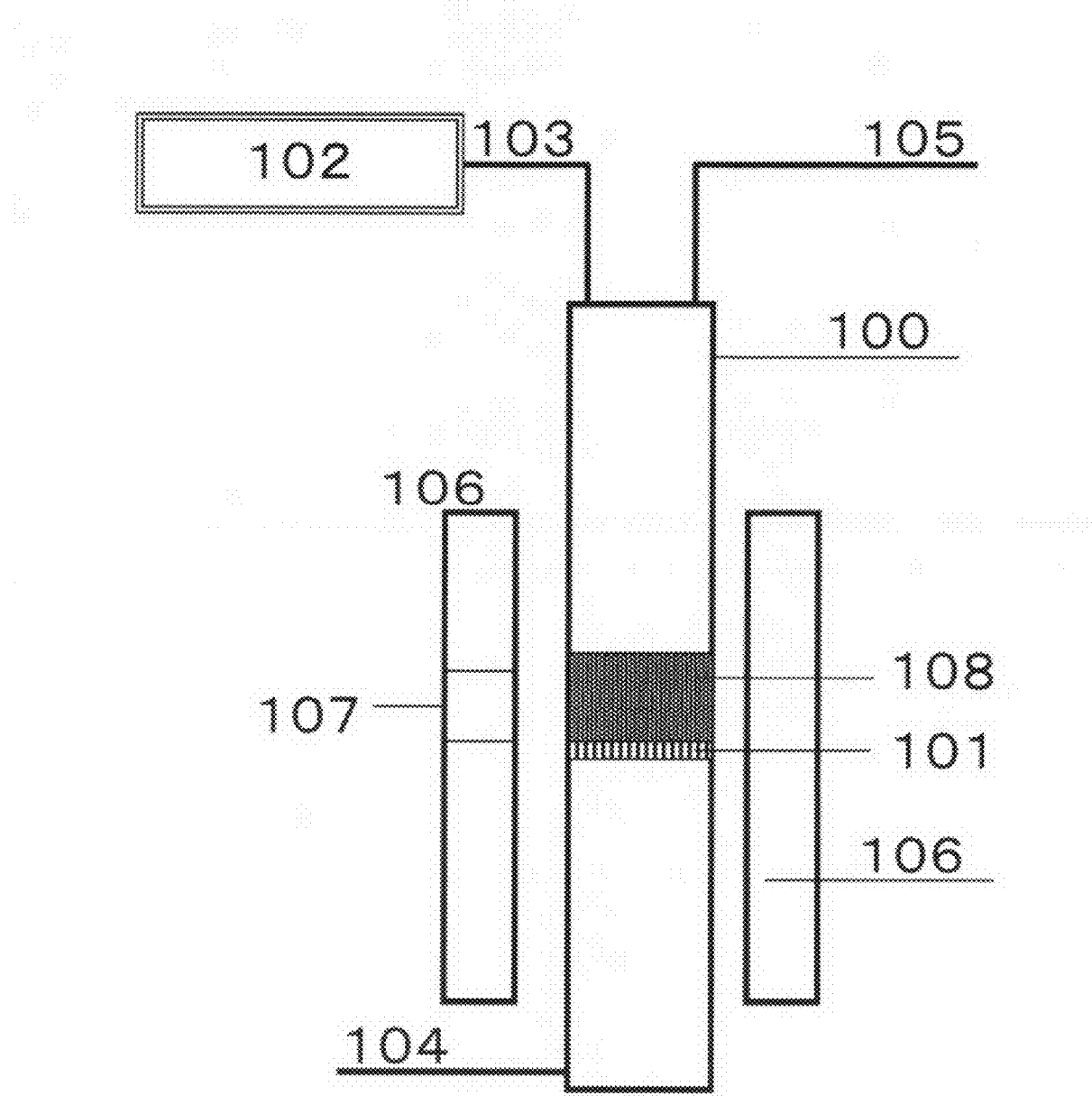
FIG. 1 is a schematic diagram of the fluid bed vertical reactor used in production of the aggregate of carbon nanotubes of Example 1.

100 Reactor
101 Quartz sintered plate
102 Sealed feeder of catalyst
103 Catalyst input line
104 Raw gas supply line
105 Waster gas line
106 Heater
107 Inspection port
108 Catalyst
200 Reactor
201 Non-woven fabric
204 Raw gas supply line
205 Waster gas line
206 Heater
207 Inspection port
208 Catalyst

BEST MODE FOR CARRYING OUT THE INVENTION

In the present invention, an aggregate of carbon nanotubes means an aggregate that a plurality of carbon nanotubes are present. The existence form of carbon nanotubes is not particularly limited, they may be present each independently, or in a form such as bundle and entanglement, or in a form being mixed with these forms. Further, they may include various sorts of the number of layers or diameter. Even in the case that a plurality of carbon nanotubes are included in a dispersion liquid, a composition that another component is compounded, or in a composite composited with the other component, it is interpreted that an aggregate of carbon nanotubes is included. The aggregate of carbon nanotubes may include an impurity (for example, catalyst) derived from the production method.

The volume resistivity of the aggregate of carbon nanotubes of the present invention is from $1 \times 10^{-5}$ $\Omega$·cm to $5 \times 10^{-3}$ $\Omega$·cm. Under a suitable production condition, it is possible to obtain an aggregate of carbon nanotubes of $1 \times 10^{-5}$ $\Omega$·cm to $1 \times 10^{-3}$ $\Omega$·cm. The volume resistance of the aggregate of carbon nanotubes can be calculated as follows: a film of carbon nanotubes is produced as below, after the surface resistance of the film is measured by a four terminal method, it can be calculated from multiplying the surface resistance by the film thickness of the film of carbon nanotubes. The surface resistance can be measured using a 4 terminal 4 probe method in accordance to JISK7149, for example, by Loresta EP MCP-T360 (manufactured by Dia Instruments Co., Ltd.). In a high resistance measurement, it can be measured using Hiresta UP MCP-HT450 (manufactured by Dia Instruments Co., Ltd., 10 V, 10 seconds).

Samples for measurement are produced as follows. 20 mg of carbon nanotubes and 16 mL of N-methylpyrrolidone are mixed, using an ultrasonic homogenizer, irradiated by ultrasonic wave at an output power of 20 W for 20 minutes, then mixed with 10 mL of ethanol, and filtered material is obtained by using a filter of 35 mm$\phi$ in inner diameter. By drying this filtered material together with the filter and filter paper used in filtration at 60° C. for 2 hours, a film of carbon nanotubes for measurement can be obtained. The film of carbon nanotubes produced is peeled off from the filter paper with tweezers for measurement. When the film of carbon nanotubes cannot be peeled off from the filter paper, after the total thickness of the film of carbon nanotubes and the filter paper is measured, from which by subtraction of the thickness of filter paper alone, the film thickness of the film of carbon nanotubes may be calculated. As the filter paper used for filtration, for example, a membrane filter (OMNIPORE MEMBRANE FILTERS, FILTER TYPE: 1.0 $\mu$m JA, 47 mm$\phi$) can be used. The pore diameter of a filter paper may be 1.0 $\mu$m or less as long as filtrate passes through it. The material of a filter paper needs to be a material that is not dissolved in NMP and ethanol, preferably, using a filter made of fluorinated resin is suitable.

Since the aggregate of carbon nanotubes of the present invention is particularly good in electrical conductivity, for example, in the case of utilizing it in a conductive layer necessary for transparency like a transparent electrode, it exhibits a sufficient electrical conductivity even when usage of carbon nanotubes is small, and an improving effect on transparency thanks to reduction of usage is obtained.

A carbon nanotube has a tubular shape that one face of graphite is wound, one wound in one layer is called a single-walled carbon nanotube, and one wound in multilayer is called a multi-walled carbon nanotube. Of multi-walled carbon nanotubes, in particular, one wound in two layers is called a double-walled carbon nanotube. The shape of carbon nanotube can be examined by a high-resolution transmission electron microscope. It is more preferable that the layer of graphite is seen straight and clear by a transmission electron microscope, but there may be no problem even when the layer of graphite is disturbed.

For the aggregate of carbon nanotubes of the present invention, in observation by a transmission electron microscope, 50 or more out of 100 pieces of carbon nanotubes are double-walled carbon nanotubes. When carbon nanotubes are observed at a magnification of 400,000 using a transmission electron microscope, in a view of 75 nm square, 100 pieces of carbon nanotubes randomly selected from a view that 10% or more of view area is aggregates of carbon nanotubes are evaluated for the number of layers. In the case where 100 pieces in one view cannot be measured, it is measured from a plurality of views till reaching 100 pieces. In this case, one piece of carbon nanotube will count as one piece when part of a carbon nanotube is seen in a view, and both ends must not necessarily be seen. Further, even when it is recognized as two pieces in a view, they may be connected outside the view into one piece, but in this case, it will count as two pieces.

Generally, regarding carbon nanotubes, the fewer the number of layers is, the degree of graphitization is higher, that is, electrical conductivity is high, but durability tends to be lowered. On the other hand, regarding carbon nanotubes, the more the number of layers increases, the degree of graphitization becomes lower, that is, electrical conductivity is low, but durability tends to become high. Since a double-walled carbon nanotube has high durability and high degree of graphitization as well, it is both highly durable and highly conductive. Therefore, the higher ratio of double-walled carbon nanotubes is preferable. In the present invention, the ratio of double-walled carbon nanotubes when measured by the above method needs to be 50 or more of 100 pieces, more preferably 70 or more of 100 pieces, further preferably 75 or more of 100 pieces, and most preferably 80 or more of 100 pieces.

It is preferable that the average of outer diameter of carbon nanotubes is in a range of 1.0 to 3.0 nm. This average of outer diameter is an arithmetic average when the outer diameters of 100 carbon nanotubes are measured by observing a sample in the same method as the above-described evaluation of the number of layers.

The carbon nanotubes preferably have a narrow distribution of their outer diameters. Specifically, standard deviation of outer diameter is preferably 1.0 nm or less, more preferably 0.8 nm or less, and further preferably 0.7 nm or less. The standard deviation is a standard deviation calculated from outer diameter of 100 pieces evaluated in the same method as the foregoing evaluation method for the outer diameter. When the distribution of outer diameter of carbon nanotubes is smaller, they tend to become an aggregate of carbon nanotubes of good electrical conductivity.

Regarding the aggregate of carbon nanotubes of the present invention, the weight loss from 200° C. to 400° C. in thermogravimetry at a temperature rise of 10° C./min is from 5% to 20%. The weight loss can be measured by thermal analysis of aggregate of carbon nanotubes under an air atmosphere. About 1 mg of sample is placed in a differential thermal analyzer (for example, TGA-60 manufactured by Shimadzu Corporation), temperature is raised in air from room temperature to 900° C. at a rate of temperature rise of 10° C./min. The weight loss from 200° C. to 400° C. in this case is a ratio of the amount of weight loss from 200° C. to 400° C. relative to the amount of weight loss from 200° C. to 900° C.

In general, carbon impurities such as amorphous carbon other than carbon nanotubes decompose at 400° C. or less, thus when aggregates of carbon nanotubes including carbon impurities are subjected to thermogravimetry, a weight loss from 200° C. to 400° C. is observed. The more the carbon impurities, the more the weight loss from 200° C. to 400° C. becomes. Ordinarily, the more the carbon impurities, the more the electrical conductivity lowers as the aggregate of carbon nanotubes, thus generally by reducing carbon impurities, electrical conductivity of aggregate of carbon nanotubes has been tried to increase. In fact, there have been a lot of reports on methods for producing aggregates of carbon nanotubes that the weight loss from 200° C. to 400° C. is less than 5% and the ratio of double-walled carbon nanotubes is high. However, for the aggregate of carbon nanotubes of the present invention, it is rather superior in electrical conductivity when the weight loss from 200° C. to 400° C. is from 5% to 20%.

In spite of the fact that the aggregate of carbon nanotubes of the present invention has a weight loss from 200° C. to 400° C. by 5% to 20%, the reason for having a high electrical conductivity is not clear. However, an aggregate of carbon nanotubes that ordinary carbon impurities are included by 5% or more by weight ratio does not show as high electrical conductivity as in the present invention unless a special treatment is conducted. In the present invention, the fact that the weight loss from 200° C. to 400° C. is from 5% to 20% presumably shows that the weight loss is in the range as a result of having many functional groups burnt out in the above-described temperature range not of carbon impurity.

In the case that a C=O group being an electron withdrawing functional group bonds to the surface of carbon nanotube, there arises an effect that a carbon nanotube is p-doped, thus it is thought that electrical conductivity of carbon nanotube becomes very high. However, since functionalization generates defects in a graphite layer, when there are too many functional groups, electrical conductivity of carbon nanotube itself deteriorates. On the other hand, when there are too few functional groups, effect of doping and effect of defect are cancelled, and the effect of improving electrical conductivity is not exhibited. It is thought that the level of suitable amount of functionalization is in a range of 5 to 20% of weight loss in the range of 200° C. to 400° C. From the point of electrical conductivity of carbon nanotubes, the weight loss is more preferably 5 to 15%, and further preferably 6 to 13%. p Among functional groups, a C—O group and a C=O group can be confirmed by X-ray photoelectron spectroscopy (XPS). For example, it can be confirmed by that O1s peak is detected in the vicinity of 532 to 533 (eV) as the peaks of a C—O group and a C=O group in the condition; excited X-ray: Monochromatic AL $K_{1,2}$ ray, X-ray diameter: 1,000 μm, photoelectron escaping angle: 90° (tilt of detector to sample surface). Ordinarily, in the case of carbon nanotube, Binding Energy (eV) is C—O>C=O. Preferably, as the result of analysis on surface composition (atomic %) by X-ray photoelectron spectroscopy, it is suitable to confirm that there is no element appearing a peak in the same position.

As another index on the ratio of functionalization of carbon nanotubes, it is possible to use a surface composition analysis of X-ray photoelectron spectroscopy (XPS). In the present invention, as a result of the surface composition analysis of X-ray photoelectron spectroscopy (XPS), it is preferable that the ratio of oxygen atoms to carbon atoms is 4% or more (atomic %) for an aggregate of carbon nanotubes showing an excellent electrical conductivity. As described above, in the case of too large ratio of functionalization, defect due to functionalization is increased, as a result, electrical conductivity of carbon nanotube itself deteriorates, thus the ratio of oxygen atoms to carbon atoms is preferably 20% or less (atomic %), more preferably 15% or less, and further preferably 11% or less.

Regarding the aggregate of carbon nanotubes of the present invention, it is preferable that the largest peak of DTA curve in differential thermal analysis at a temperature rise of 10° C./min is in a range of 650° C. to 750° C. This peak can be measured by conducting differential thermal analysis of aggregates of carbon nanotubes under an air atmosphere. About 1 mg of sample is placed in a differential thermal analyzer (for example, TGA-60 manufactured by Shimadzu Corporation), temperature is raised in air from room temperature to 900° C. at a rate of temperature rise of 10° C./min. In this case, the value of DTA curve (x axis is temperature (° C.) and y axis is DTA signal (μV/mg)) is read. The largest peak of DTA curve is a temperature when the value of DTA signal becomes largest, and also called a combustion peak temperature.

Ordinarily, the higher the degree of graphitization of carbon nanotubes is, and the less the carbon impurity is, the combustion peak temperature appears at a high temperature side, and the combustion peak temperature being higher is preferable from the point of carbon nanotubes with high durability. However, in the aggregate of carbon nanotubes of the present invention, from the balance of the level of functionalization and purity of carbon nanotubes, it is preferable that combustion peak temperature is in a range of 650° C. to 750° C. More preferably it is from 665° C. to 735° C.

Ordinarily, an aggregate of carbon nanotubes composed of short carbon nanotubes lowers in electrical conductivity in comparison with an aggregate of carbon nanotubes composed of long carbon nanotubes. The aggregate of carbon nanotubes of the present has a high electrical conductivity even when the average length of carbon nanotubes is 10 μm or less, suitably has a high electrical conductivity even when the average length of carbon nanotubes is 5 μm or less, and further suitably has a high electrical conductivity even when the average length of carbon nanotubes is 3 μm or less. The lower limit of the average length of carbon nanotubes is preferably 100 nm or more because when too short, carbon nanotubes have too many contact points each other resulting in a large influence of increase in resistance. The average length means a value when a sample for measurement is prepared by the following method and measured by AFM, then an arithmetic average is calculated from all the lengths of carbon nanotubes that were able to be measured.

A sample is prepared as follows. 15 mg of aggregates of carbon nanotubes, 450 μL of ammonium polystyrene sulfonate aqueous solution (manufactured by Aldrich Corporation, 30 weight %, weight-average molecular weight of 200,000, measured by GPC in terms of polystyrene) and 9.550 mL of distilled water are added into a 20 mL container, subjected to dispersion treatment at an output power of 20 W in an ultrasonic homogenizer under ice cooling for 20 minutes to prepare a dispersion liquid of aggregate of carbon nanotubes. The dispersion liquid obtained is centrifuged at 20,000 G for 15 minutes using a high-speed centrifugal machine to obtain 9 mL of the supernatant. The supernatant obtained is diluted by 65 times with distilled water, and applied to mica by a bar coater (No. 3), then dried at 120° C. for 2 minutes, and the resulting thin film is used as a sample.

The aggregate of carbon nanotubes of the present invention is useful as a field emission material. For example, in the case that a composition containing the aggregate of carbon nanotubes of the present is used as an electron source of field emission, since electrical conductivity is high, an applied voltage can be suppressed low. Since durability of the aggregate of carbon nanotubes of the present invention can be assumed to be good, it is thought to be a good emission material.

By using the aggregate of carbon nanotubes of the present invention, a molded article of carbon nanotubes with a very high electrical conductivity can be produced. Suitably, a molded article of carbon nanotubes with a very high electrical conductivity and excellent strength can be produced. The molded article of carbon nanotubes means all present in a state shaped by forming or processing aggregates of carbon nanotubes. Forming or processing denotes all operations that the shape of aggregates of carbon nanotubes changes, and that experience a process. As an example of the molded article of carbon nanotubes, there are listed a thread, chip, pellet, sheet, block and the like comprising the aggregates of carbon nanotubes. The molded article of carbon nanotubes includes the resulting materials by combining these, and subjected to further forming or processing.

As the forming method, there can be used a method that liquid including aggregates of carbon nanotubes is subjected to liquid-elimination such as filtration and evaporation to form into film, membrane or sheet, a method that liquid including aggregates of carbon nanotubes is put in a mold, followed by evaporating a dispersion medium and the like. Further, there can be also used a method that aggregates of carbon nanotubes are compressed by a press machine, and a method by grinding or cutting with a cutter. In addition thereto, a method that carbon nanotubes in the liquid including aggregates of carbon nanotubes are agglomerated can be also suitably used. As the method that carbon nanotubes in the liquid including aggregates of carbon nanotubes are agglomerated, being varied depending on the kind of dispersion medium, there is a method that, when a dispersion medium is water for example, liquid including aggregates of carbon nanotubes is poured in an organic solvent.

The aggregate of carbon nanotubes of the present invention can be used as a composition by mixing with a substance other than carbon nanotubes or being dispersed. The composition including the aggregate of carbon nanotubes of the present invention can be made into a composition with a very high electrical conductivity, excellent strength, excellent thermal conductivity, or high electrical conductivity and high strength. The substance other than carbon nanotubes herein may be a resin, metal, glass, organic solvent and water etc. for example. Further, it may be an adhesive, cement, gypsum, ceramic and the like. These substances may be used alone or in combination of 2 kinds or more thereof.

The dispersion herein is a state that carbon nanotubes are uniformly dispersed in the above-described substance. It is expressed as "carbon nanotubes are dispersed" when they are in a state where carbon nanotubes are each raveled, bundle thereof is formed, or bundles with various thicknesses are mixed, as long as they are uniformly dispersed in the above-described substance.

Mixing herein means a state where aggregates of carbon nanotubes are inhomogeneously dispersed in the above-described substance, or aggregates of carbon nanotubes and the above-described substance of solid state are simply mixed up.

The content of carbon nanotubes in a composition is not quantitatively restricted in the case of mixing, and it is possible to mix in a desired ratio. In the case of being dispersed, depending on the kind of the substance other than carbon nanotubes, but it is possible to contain them suitably by 0.01 to 20 weight % in a composition, more preferably 0.01 to 10 weight %, further preferably 0.01 to 5 weight %, above all, 0.05 to 1 weight % is more suitable. Being dependent on the purpose, when carbon nanotubes are added too much, there is a case that strength of composition of carbon nanotubes is lowered.

Of substances other than carbon nanotubes, a resin is not particularly limited as long as it can mix and disperse carbon nanotubes, a natural resin and a synthetic resin can be used. As the synthetic resin, a thermosetting resin and a thermoplastic resin can be suitably used. A thermoplastic resin is preferable because the resulting molded article is excellent in impact strength, and press molding and injection molding with a high molding efficiency are possible.

The thermosetting resin is not particularly limited, for example, there can be used an unsaturated polyester resin, vinyl ester resin, epoxy resin, cyanate ester resin, benzoxazine resin, phenol (resole type) resin, urea·melamine resin, thermosetting polyimide etc., and a copolymer thereof, degenerated one, and blended resin of 2 kinds or more thereof and the like. In order to improve impact resistance, it may be a resin that a soft component such as elastomer, synthetic rubber, natural rubber or silicone was added to the above-described thermosetting resin.

The thermoplastic resin is not particularly limited, for example, there can be used polyester, polyolefin, styrene based resin, polyoxymethylene, polyamide, polycarbonate, polymethylene methacrylate, polyvinyl chloride, polyphenylene sulfide, polyphenylene ether, polyimide, polyamide-imide, polyetherimide, polysulfone, polyether sulfone, polyketone, polyether ketone, polyether ether ketone, polyether ketone ketone, polyarylate, polyether nitrile, phenol (novolac type etc.) resin, phenoxy resin, fluorinated resin such as polytetrafluoroethylene; thermoplastic elastomer such as polystyrene type, polyolefin type, polyurethane type, polyester type, polyamide type, polybutadiene type, polyisoprene type and fluorine type; and a copolymer thereof, degenerated one, and blended resin of 2 kinds or more of these resins and the like. In order to improve impact resistance, it maybe a resin that a soft component such as other elastomer, synthetic rubber, natural rubber or silicone was added to the above-described thermoplastic resin.

The styrene based resin herein is a resin containing a unit produced from styrene and/or the derivative (sometimes collectively called an aromatic vinyl monomer). At least one kind of aromatic vinyl monomers may be polymerized, or copolymerized with at least one kind of other copolymerizable monomers. A rubber-reinforced styrene based resin is also preferably used. As the rubber-reinforced styrene based resin, two kinds of configurations are listed including one with a structure that a (co)polymer containing an aromatic vinyl monomer is partly grafted to a rubber polymer, and one with a non-graft structure. As a specific example of the styrene based resin, there are listed PS (polystyrene), HIP (high-impact polystyrene), an AS resin, an AES resin, an ABS resin, a MBS resin (methyl methacrylate/butadiene/styrene copolymer: "/" means copolymerization), an ASA resin (acrylonitrile/styrene/acryl rubber copolymer) and the like.

The polycarbonate is not particularly limited, for example, there is listed an aromatic homo-polycarbonate or co-polycarbonate obtained by reacting an aromatic divalent phenolic compound with phosgene or diester carbonate, having a viscosity-average molecular weight in a range of 10,000 to 1,000,000.

The polyamide is not particularly limited, for example, there can be preferably used nylon 6, nylon 66, nylon 46, nylon 610, nylon 612, nylon 9T (T is terephthalic acid), nylon 66/6, /nylon 66/6T, nylon 66/6I (I is isophthalic acid), nylon 6/6T, nylon 6/6T, nylon 12/6T, nylon 6T/6I, nylon 66/6T/6I, nylon 66/6/6T, nylon 66/6/6I, nylon 6T/M5T (M is methylpentadiamine), poly(m-xyleneadipamide), and a copolymer thereof, a mixture thereof, or the like.

The polyester is not particularly limited, for example, a polycondensate of dicarboxylic acid with glycol, ring-opening a polycondensate of cyclic lactone, a polycondensate of hydroxyl carboxylic acid, a polycondensate of dibasic acid with glycol, and the like are listed. Specifically, there can be listed polyethylene terephthalate, polypropylene terephthalate, polytrimethylene terephthalate, polybutylene terephthalate, polyethylene naphthalate, polybutylene naphthalate, poly(cyclohexanedimethylene terephthalate), and polyethylene-1,2-bis(phenoxy)ethane-4,4'-dicarboxylate, and a copolymer thereof, a mixture thereof, or the like.

In the case that a composition containing aggregates of carbon nanotubes is provided with high fire retardance or high formability, a phenolic resin can be used as a resin. Such phenolic resin means one that a component having at least a phenolic hydroxyl group is polymerized alone or copolymerized, for example, there can be listed various types of phenol resins (phenol novolac, cresol novolac, octyl phenol, phenyl phenol, naphthol novolac, phenol aralkyl, naphthol aralkyl, phenol resol, etc.) and a modified phenol resin (alkylbenzene-modified (particularly xylene-modified), cashew-modified, terpene-modified, etc.).

In addition thereto, there are listed a polyalcohol-type resin typified by polyvinyl alcohol, a polycarboxylic acid type resin typified by polyvinyl acetate, an acrylic resin such as polyacrylate, and a resin such as polyacrylonitrile. There can be also listed an adhesive or stick of acryl type, silicone type, vinyl type such as vinyl acetate resin and a vinyl ether resin.

The metal is not particularly limited as long as it can mix or disperse carbon nanotubes, aluminum, copper, silver, gold, iron, nickel, zinc, lead, tin, cobalt, chromium, titanium, tungsten and the like can be used alone or in composite. The glass is not particularly limited as long as it can mix or disperse carbon nanotubes, soda lime glass, lead glass, boric acid glass and the like are listed.

As a method for mixing or dispersing the above-described substance and the aggregate of carbon nanotubes of the present invention, for example, there can be used a method that the aggregate of carbon nanotubes is mixed up while the above-described substance is stirred in the molten state, a method that in a mixed state of powder of the above-described substance and powder of the aggregate of carbon nanotubes, the above-described substance is melted, then solidified, or the like.

The organic solvent is not particularly limited as long as it can mix or disperse carbon nanotubes, various organic compounds can be used, such as alcohol, an aromatic compound, an aliphatic compound, a glycol compound, an amide compound, an ester compound and an ether compound. These compounds may be used alone or in a mixture thereof. As the alcohol, there can be listed methanol, ethanol, propanol, butanol, pentanol, hexanol, heptanol, octanol, nonanol, decanol and the like. As the aromatic compound, there can be listed benzene, toluene, xylene, chlorobenzene, dichlorobenzene, phenol, pyridine, thiophene, furan and the like. As the aliphatic compound, there can be listed pentane, hexane, heptane, octane, nonane, decane, undecane, dodecane and the like. As the glycol compound, there can be listed ethylene glycol, propylene glycol, glycerin and the like. As the amide compound, there can be listed dimethylformamide, ethylmethylformamide, dimethylacetylamide and the like. As the ester compound, there can be listed formate (methyl formate, ethyl formate, etc.) acetate(ethyl acetate, methyl acetate, etc.), butyrate(methyl butyrate, ethyl butyrate, etc.) and the like. As the ether compound, there can be listed diethyl ether, ethyl methyl ether, tetrahydrofuran and the like. Isomers, derivatives or the like of these compounds can be used. In addition thereto, there are listed chloroform, dichloromethane, dimethyl sulfoxide, supercritical carbon dioxide, carbon disulfide and the like.

Among the above-described compositions of carbon nanotubes, as for a solid one, a molded article can be made through forming or processing by means of operations such as compression, cutting, grinding, elongation and boring into a shape, or through conversion to a solid again in a specific shape after melting.

In the present invention, a composition of carbon nanotubes obtained by dispersing aggregates of carbon nanotubes in a liquid dispersion medium such as organic solvent or water is also preferable. There is a case that such composition of carbon nanotubes is called a dispersion liquid of carbon nanotubes or a dispersion liquid from here on.

As a method for mixing and dispersing the above-described substance and the aggregate of carbon nanotubes of the present invention, for example, in the case of mixing, after simply mixing them, it is suitable to stir by a screw or bar, and shaking is also preferable. In the case of dispersing them, suitably it is possible to use a ball mill, bead mill, roll mill, grinding mill and ultrasonic homogenizer. The combination of the above methods is also suitable.

In the case that aggregates of carbon nanotubes are dispersed in a liquid dispersion medium to obtain a dispersion liquid of carbon nanotubes, it is preferable to contain an additive such as surfactant and various types of polymer materials. This is because the surfactant and some kinds of polymer materials are useful for improving dispersibility and dispersion stability of carbon nanotubes.

Surfactants are classified into an ionic surfactant and a nonionic surfactant, and any surfactants can be used in the present invention. The surfactants can be used alone or in a mixture of 2 kinds or more thereof.

The ionic surfactants are classified into a cationic surfactant, an amphoteric surfactant and an anionic surfactant. As the cationic surfactant, an alkylamine salt, a quaternary ammonium salt and the like are listed. As the amphoteric surfactant, an alkyl betaine type surfactant, an amine oxide type surfactant and the like are listed. As the anionic surfactant, there are listed an alkylbenzenesulfonic acid salt such as dodecylbenzenesulfonic acid, an aromatic sulfonic acid type surfactant such as a dodecyl phenyl ether sulfonate salt, a monosoap type anionic surfactant, an ether sulfate type surfactant, a phosphate type surfactant, a carboxylic acid type surfactant and the like, above all, from the point of excellence in dispersibility, dispersion stability and heightening concentration, one containing an aromatic ring, that is, an aromatic ionic surfactant is preferable, in particular, an aromatic ionic surfactant such as an alkylbenzenesulfonic acid salt and dodecyl phenyl ether sulfonate is preferable.

As an example of the nonionic surfactant, there are listed a sugar ester type surfactant such as a sorbitane fatty acid ester and a polyoxyethylene sorbitane fatty acid ester; a fatty acid ester type surfactant such as a polyoxyethylene fatty acid ester and a polyoxyethylene fatty acid diethyl ester; an ether type surfactant such as a polyoxyethylene alkyl ether, a polyoxyethylene alkyl phenyl ether and a polyoxyethylene olypropylene glycol; an aromatic nonionic surfactant such as a polyoxyalkylene octyl phenyl ether, a polyoxyalkylene nonyl phenyl ether, a polyoxyalkyl dibutyl phenyl ether, a polyoxyalkyl styryl phenyl ether, a polyoxyalkyl benzyl phenyl ether, a polyoxyalkyl bisphenyl ether and polyoxyalkyl cumyl phenyl ether. Above all, from the point of excellence in dispersibility, dispersion stability and heightening concentration, an aromatic nonionic surfactant is preferable, particularly a polyoxyethylene phenyl ether is preferable.

Other than the surfactant, various types of polymer materials can be added to a dispersion liquid of carbon nanotubes. For examples, there are a water-soluble polymer such as polyvinyl alcohol, polyvinyl pyrrolidone, ammonium polystyrenesulfonate and sodium polystyrenesulfonate; a sugar polymer such as sodium carboxymethylcellulose (Na-CMC), methylcellulose, hydroxyethylcellulose, amylose, cycloamylose and chitosan, and the like. There can be also used a conductive polymer such as polythiophen, polyethylene dioxythiophen, polyisothianaphthene, polyaniline polypyrrole and polyacetylene, and derivatives thereof. Above all, using a conductive polymer and the derivative is preferable because conductive characteristic of carbon nanotube can be efficiently exhibited.

The method for producing a dispersion liquid of carbon nanotubes is not particularly limited, for example, the dispersion liquid can be produced in such manner that aggregates of carbon nanotubes, additives and a dispersion medium are mixed using a mixed dispersion machine commonly used in paint production (for example, ball mill, bead mill, sand mill, roll mill, homogenizer, attritor, dissolver, paint shaker, etc.).

For an application requiring a particularly excellent electrical conductivity or a case used in a conductive layer of transparent electrode, it is preferable that a dispersion liquid of carbon nanotubes is subjected to size fractionation by centrifugal separation or filtration before coating. For example, by conducting centrifugal separation of dispersion liquid, undispersed carbon nanotubes, excess amount of additive, metal catalyst that may be mixed in synthesis of carbon nanotubes, and the like are precipitated. When centrifugal supernatant is collected, impurities can be removed as precipitate, thereby re-agglomeration of carbon nanotubes can be prevented, and stability of dispersion liquid can be improved. Further, in the case of conducting centrifugal separation by a strong centrifugal force, size fractionation of carbon nanotubes can be done according to the thickness or length, and light transmittance of film can be improved.

Centrifugal force in centrifugal separation may be 100 G or more, preferably 1,000 G or more, and more preferably 10,000 G or more. The upper limit is not particularly limited, 200,000 G or less is preferable from performance of a widely-used ultracentrifugal machine.

Filter used in filtration can be suitably chosen in a range of 0.05 μm to 5.0 μm. Thereby, in undispersed carbon nanotubes and impurities that may be mixed in synthesis of carbon nanotubes, etc., those with the relatively large size can be removed.

When size fractionation is conducted in this way, a dispersion liquid of carbon nanotubes is prepared so that composition after size fractionation comes to a desired range.

In the present invention, using the above-described composition of carbon nanotubes, a conductive layer is formed on a substrate to be a composite, which is effective from the point that a composite excellent in electrical conductivity can be produced. In particular, in the case that the substrate is a transparent substrate and a composite needs both transparency and electrical conductivity, it has electrical conductivity even when the use amount of aggregates of carbon nanotubes is small, thus transparency becomes high as well, which is particularly effective. Hereinafter, in the case that a substrate of the composite comprising aggregates of carbon nanotubes is film with transparency, such composite is sometimes called a transparent conductive film.

Regarding a method for forming a conductive layer using the composition of carbon nanotubes, it can be formed by coating a substrate with the above-described dispersion liquid of carbon nanotubes. The method is not particularly limited, there can be used a publicly known coating method, for example, spray coating, immersion coating, spin coating, knife coating, kiss coating, gravure coating, screen printing, ink jet printing, pad printing, other kind of printing, or roll coating etc. The most preferable coating method is roll coating. Coating may be repeated no matter how many times, and two different kinds of coating methods may be combined. In the case that a dispersion medium of dispersion liquid is volatile, unnecessary dispersion medium can be removed by a method such as air drying, heating and reduced pressure. Thereby carbon nanotubes form a three-dimensional structure and are fixed on a substrate. Thereafter, additives such as a surfactant being a component in liquid and various types of polymer materials are preferably removed by using a suitable solvent. By this operation, dispersion of electrical charge becomes easy, and electrical conductivity of a conductive layer is improved. As a solvent for removing additives such as surfactant and various types of polymer materials, it is not particularly limited as long as it dissolves additives such as surfactant and various types of polymer materials, and it may be an aqueous solvent or a nonaqueous solvent. Specifically, as an aqueous solvent, water and alcohols are listed, as a nonaqueous solvent, chloroform, acetonitrile and the like are listed.

In the case that electrical conductivity of a conductive layer needs to be improved, it is possible to increase the amount of carbon nanotubes in a composition of carbon nanotubes. In the case that electrical conductivity needs to be more improved by a small amount of carbon nanotubes, it is preferable that carbon nanotubes are uniformly dispersed in a composition of carbon nanotubes, and bundle is thinner. It is more preferable that bundle is raveled out, and carbon nanotubes are each independently dispersed. In regard to the adjustment of bundle thickness, it is possible to prepare by changing dispersion time of the above-described dispersion method, and the kind of surfactants and various types of polymer materials added as additives.

As a dispersion medium of aggregates of carbon nanotubes for forming a conductive layer, it may be an aqueous solvent or an organic solvent. As an organic solvent, the organic solvents as described above can be used. Among these, as a dispersion medium for forming a conductive layer of transparent electrode, preferable is a dispersion medium containing a solvent selected from water, alcohol, toluene, acetone and ether, or a solvent combined therewith. When an aqueous solvent is needed, and when a binder is used as described below and the binder is an inorganic polymer type binder, a polar solvent such as water, alcohols and amines is used. When liquid one at room temperature is used as a binder as described below, it can be used as a dispersion medium in itself.

The compounding ratio of each component in the above-described dispersion liquid is as follows. A dispersion liquid of carbon nanotubes preferably contains aggregates of carbon nanotubes in liquid by 0.01 weight % or more, and more preferably by 0.1 weight % or more. As the upper limit of concentration of aggregates of carbon nanotubes, ordinarily, it is preferably 20 weight % or less, more preferably 5 weight % or less, and further preferably 2 weight % or less.

The content of surfactant and other additive is not particularly limited, and it is preferably 0.1 to 50 weight %, and more preferably 0.2 to 30 weight %. The mixing ratio by weight of the above-described additive and carbon nanotubes (additive/carbon nanotubes) is preferably 0.1 to 20, and more preferably 0.3 to 10.

Regarding the dispersion liquid of carbon nanotubes, it is also possible to produce a dispersion liquid of a higher concentration than a desired concentration of carbon nanotubes, and use it in a desired concentration by diluting with a solvent. For an application requiring not so much electrical conductivity, it may be used after diluting the concentration of carbon nanotubes, or may be produced in a state that concentration is initially low.

The dispersion liquid of the present invention and a liquid added with binder, etc. thereto are used as a transparent coating liquid not only for a transparent substrate but also for any coating member, for example, for coating a colored substrate and fiber. For example, when coating floor material and wall material in a clean room and the like, that can be used as antistatic floor and wall materials, and when coating fiber, that can be used as antistatic clothes, mat, curtain and so on.

As described above, after a composite is formed by coating a substrate with the dispersion liquid of carbon nanotubes, this composite is preferably overcoated with a binder material capable of forming a transparent coat. Overcoating is effective for further dispersion and migration of electrical charge.

The composite can be also obtained by containing a binder material capable of forming a transparent coat in a dispersion liquid of carbon nanotubes, and coating a suitable substrate, then according to need, heated for drying or baking a coated film (hardening). In this case, heating conditions are suitably set according to the kind of binder. In the case that a binder is light or irradiation hardening, a coated film is hardened not by heat hardening but by irradiation of light or radiation on a coated film right after coating. As radiation, ionic radiation such as electron ray, ultraviolet ray, X-ray, and gamma ray can be used, and the irradiation amount is determined according to the kind of binder.

The above-described binder is not particularly limited as long as it is used in a conductive paint, there can be used various types of organic and inorganic binders, namely, a transparent polymer or the precursor (hereinafter, sometimes called "organic polymer type binder") or an inorganic polymer or the precursor (hereinafter, sometimes called "inorganic polymer type binder"). The organic polymer type binder may be any thermoplastic, thermosetting, or radiation hardening such as ultraviolet ray and electron ray. As an example of suitable organic binders, there are organic polymers such as polyolefin type (polyethylene, polypropylene, etc.), polyamide type (nylon 6, nylon 11, nylon 66, nylon 6,10, etc.), polyester type (polyethylene terephthalate, polybutylene terephthalate, etc.), silicone type polymer, vinyl type resin (polyvinyl chloride, polyvinylidene chloride, polyacrylonitrile, polyacrylate, polystyrene derivative, polyvinyl acetate, polyvinyl alcohol, etc.), polyketone, polyimide, polycarbonate, polysulfone, polyacetal, a fluorine resin, a phenol resin, a urea resin, a melamine resin, an epoxy resin, polyurethane, cellulosic polymer, proteins (gelatin, casein, etc.), chitin, polypeptide, polysaccharides and polynucleotide, and the precursors of these polymers (monomer, oligomer). An organic polymer type transparent coat or matrix (in the case of mixing in liquid) can be formed from these by simply evaporating a solvent, or by heat hardening, or hardening by irradiation of light or radiation.

Preferable one as the organic polymer type binder is a compound having an unsaturated bond capable of radical polymerization hardening by radiation or light. This is a monomer, oligomer or polymer having a vinyl group or a vinylidene group. As such monomer, there are a styrene derivative (styrene, methylstyrene, etc.), acrylic acid, methacrylic acid or the derivative (alkyl acrylate or methacrylate, allyl acrylate or methacrylate, etc.), vinyl acetate, acrylonitrile, itaconic acid and the like. The oligomer or polymer is preferably a compound having a double bond in a main chain, or a compound having an acryloyl or methacryloyl group at both ends of linear chain. Such radical polymerization hardening binder has high hardness and excellent abrasion resistance, and can form a conductive film coat of high transparency or matrix (in the case of mixing in liquid).

As an example of the inorganic polymer type binder, there are sol of metal oxide such as silica, tin oxide, aluminum oxide and zirconium oxide, or a hydrolysable or thermally-degradable organic phosphor compound and organic boron compound to become a precursor of an inorganic polymer, and organic metal compounds such as an organic silane compound, an organic titanium compound, an organic zirconium compound, an organic lead compound and an organic alkaline metal compound. As a specific example of the hydrolysable or thermally-degradable organic metal compound, it is alkoxide or partial hydrolysate thereof, a lower carboxylate such as acetate, and a metal complex such as acetylacetone.

When at least one inorganic polymer type binder is burnt, it is possible to form a glassy inorganic polymer type transparent coat or matrix (in the case of mixing in liquid) composed of oxide or complex oxide. The inorganic polymer type matrix is generally glassy, and it has high hardness and excellent abrasion resistance, and high transparency as well.

The use amount of binder may be an amount enough for overcoating, and an amount enough for obtaining a viscosity suitable in coating when mixed in liquid. When too small, coating does not work well, and when too much, electrical conductivity is damaged, which is bad.

As the organic polymer type binder of light or radiation hardening, binder itself can be a dispersion medium by selecting a liquid binder at ambient temperature. Namely, without presence of solvent, it is possible to produce a binder of a 100% reaction system, or a composition without solvent by diluting it with a nonreactive liquid resin component. Thereby, no evaporation of solvent is generated in hardening/drying of coat, so that hardening time is greatly shortened, and a solvent-recovery operation becomes unnecessary.

The dispersion liquid of carbon nanotubes can be mixed, in addition to carbon nanotubes, a dispersant such as a surfactant, a solvent and a binder, with additives such as a coupling agent, a crosslinking agent, a stabilizer, an antisettling agent, a coloring agent, a charge adjusting agent and a lubricant.

The dispersion liquid of carbon nanotubes can further contain another conductive organic material, conductive inorganic material or a combination of these materials.

As the conductive organic material, buckyball, carbon black, fullerene, various carbon nanotubes, and particles including these can be preferably listed.

As the conductive inorganic material, there are listed aluminum, antimony, beryllium, cadmium, chromium, cobalt, copper, dope metal oxide, iron, gold, lead, manganese, magnesium, mercury, metal oxide, nickel, platinum, silver, steel, titanium, zinc, and particles including these. Preferably, indium oxide, tin antimony oxide and mixture thereof are listed.

The composite obtained by containing these conductive materials, or the composite obtained by overcoating is very advantageous in dispersion or migration of electrical charge. A layer including these conductive materials other than carbon nanotubes and a layer including carbon nanotubes may be laminated.

The transparent conductive film obtained by using the aggregate of carbon nanotubes of the present invention can be used while being bonded with a substrate, or it is detached from the substrate, and used as a self-supporting film. In order to produce a self-supporting film, after an organic polymer type binder is further applied to a transparent conductive film, the substrate is just detached. It can be used in such manner that a substrate in production is burnt out by thermal decomposition, or melted to transfer the transparent conductive film onto another substrate. In this case, a thermal decomposition temperature of a substrate in production is preferably lower than that of a transfer substrate.

The thickness of the transparent conductive film can cover various ranges from a thickness of medium degree to very thin thickness. For example, the thickness of the present invention can be in a range of 0.5 nm to 1,000 μm. In a preferable embodiment, the thickness of film is 0.005 to 1,000 μm, more preferably 0.05 to 500 μm, more preferably 1.0 to 200 μm, and further preferably 1.0 to 50 μm.

The transparent conductive film of the present invention shows an excellent transparency. In order to measure a conductive film for light transmittance including a substrate, the following index is used as light transmittance. For example, when the film of the present invention is measured using a light source of 550 nm, light transmittance of transparent conductive film/light transmittance of substrate is preferably at least 0.6, more preferably 0.8 or more, and further preferably 0.85 or more.

Electrical conductivity of transparent conductive film is evaluated by measuring surface resistance of film. Surface resistance can be measured using a 4-terminal 4-probe method in accordance with JISK7149, for example, by Loresta EP MCP-T360 (manufactured by Dia Instruments Co., Ltd.). In high resistance measurement, it can be measured using Hiresta UP MCP-HT450 (manufactured by Dia Instruments Co., Ltd., 10 V, 10 seconds). The surface resistance of transparent conductive film is preferably less than $10^5 \Omega/\square$, and more preferably less than $1 \times 10^4 \Omega/\square$.

The transparent conductive film of the present invention is useful in various applications of transparent conductive coating such as EMI/RFI (electromagnetic interference) shield, low visibility coating, polymer electronics (for example, transparent conductive layer of OLED display, EL lamp, plastic chip). The surface resistance of transparent conductive film is adjustable by controlling the film thickness of conductive layer. For example, surface resistance is lowered by increasing film thickness, and it tends to become high by decreasing film thickness. For example, the surface resistance of conductive coating in EMI/RFI shield is generally acceptable when less than $10^4 \Omega/\square$. The surface resistance of conductive coating in EMI/RFI shield is preferably in a range of about $10^1$ to $10^3 \Omega/\square$. The surface resistance of transparent low-visibility coating is ordinarily less than $10^3$ Ω/sq., preferably, being less than $10^2 \Omega/\square$ is generally acceptable. In the case of polymer electronics and an intrinsic conductive polymer (ICP), the surface resistance is ordinarily less than $10^4 \Omega/\square$, and a preferable surface resistance is in a range of $10^{-2}$ to $10^0 \Omega/\square$. Therefore, in a preferable embodiment, the surface resistance of transparent conductive film is less than $10^4 \Omega/\square$.

The aggregate of carbon nanotubes of the present invention can be produced, as shown below, in such manner that an aggregate of carbon nanotubes with a large height ratio of G band to D band (G/D ratio) by Raman spectroscopic analysis of wavelength 633 nm is heated in a nitric acid solution (hereinafter, sometimes called nitric acid treatment). A layer constitution of the above-described aggregate of carbon nanotubes is not particularly limited as long as it includes double-walled carbon nanotubes. The aggregate of carbon nanotubes including double-walled carbon nanotubes is hereinafter called an aggregate of double-walled carbon nanotubes. The ratio of the double-walled carbon nanotubes of 100 pieces of carbon nanotubes is preferably 50 pieces or more, more preferably 70 pieces or more, further preferably 75 pieces or more, and most preferably 80 pieces or more. Ordinarily, since the existence ratio of double-walled carbon nanotubes is decreased by nitric acid treatment, in order to be a desired layer constitution, in consideration of this decrease amount, an aggregate of carbon nanotubes containing double-walled carbon nanotubes with a slightly large amount is used. The higher the ratio of double-walled carbon nanotubes in an aggregate of double-walled carbon nanotubes is, the more improved aggregate of carbon nanotubes is obtained after heating in a nitric acid solution.

In a Raman spectrum, the Raman shift observed around 1590 $cm^{-1}$ is called G band derived from graphite, and the Raman shift observed around 1350 $cm^{-1}$ is called D band derived from amorphous carbon and defects of graphite. Carbon nanotubes of the higher VD ratio are higher in degree of graphitization and higher in quality. It is preferable that the aggregate of double-walled carbon nanotubes used here has a G/D ratio in Raman spectroscopic analysis of wavelength 633 nm by 20 or more. In order to obtain an aggregate of carbon nanotubes that electrical conductivity was more improved by heating in a nitric acid solution, it is suitable that the G/D ratio is more preferably 25 or more, further preferably 30 or more, and most preferably 40 or more. The higher the G/D ratio, the larger the effect of improving electrical conductivity is, but an aggregate of carbon nanotubes of more than 200 in G/D ratio is hardly available, thus it is preferable to use an aggregate of double-walled carbon nanotubes of 200 or less in G/D ratio.

The higher the G/D ratio in the aggregate of double-walled carbon nanotubes, the more improved aggregate of carbon nanotubes in electrical conductivity is obtained after heating in a nitric acid solution, whose reason is not certain, but it is thought as follows.

In general, a single-walled carbon nanotube can easily produce an aggregate of carbon nanotubes having a high degree of graphitization, and the degree of graphitization is high, thus electrical conductivity of carbon nanotube itself is very high. However, since a single-walled carbon nanotube has only one in the number of layers of graphite sheet having a conductive structure, once defects are generated in the graphite layer by heating in a nitric acid solution, the conductive structure is destroyed, and there is a tendency that electrical conductivity is lowered by heating in a nitric acid solution.

In the case that a carbon nanotube is a double-walled carbon nanotube of high degree of graphitization, the inner layer is protected by the outer layer, thus even when the outer layer is functionalized or defect is generated, etc. by heating in a nitric acid solution, the inner layer of high degree of graphitization is hardly damaged in its graphite structure to maintain the conductive structure. Further, the outer layer can be subjected to doping effect, it is possible to efficiently utilize both the inner layer of high degree of graphitization and the outer layer subjected to doping effect.

Here, G band in Raman spectroscopic analysis is derived from graphite layer of carbon nanotubes, and D band is derived from irregular carbon such as amorphous carbon other than carbon nanotubes or from defect of graphite layer in carbon nanotubes, amorphous part and the like. In the present invention, even if derivation of D band is either case, Raman spectroscopic analysis can give an index. The reason is that when D band is derived from irregular carbon such as amorphous carbon other than carbon nanotubes, a low G/D ratio means a lot of carbon impurities such as amorphous carbon in aggregates of carbon nanotubes. In this case, a long heating time in heating in a nitric acid solution is needed, by nitric acid treatment for a long time, defect of carbon nanotube itself becomes large, and defect proceeds even in the inner layer to damage electrical conductivity of carbon nanotube itself. On the other hand, in the case that D band is derived from defect of graphite layer in carbon nanotubes, amorphous part and the like, even when defect is generated in the outer layer by heating in a nitric acid solution and the inner layer is exposed, the degree of graphitization in the inner layer is low, thus electrical conductivity is not improved so much. Further, because defect is generated even in the inner layer by nitric acid, being independent of the amount of impurities, electrical conductivity of carbon nanotube itself is lowered by nitric acid. Therefore, being independent of derivation of D band in G/D ratio, it is preferable to use carbon nanotubes of high G/D ratio.

In order to produce the aggregate of carbon nanotubes of the present invention, the reason why heating in a nitric acid solution is suitable is not certain, but it is thought as follows.

There are various methods for removing carbon impurities in a liquid phase, in the case of using an acid stronger in oxidizing power than nitric acid or an oxidant, together with removal of carbon impurities, destruction of the outer layer of multi-walled carbon nanotubes proceeds too far, and defect is often generated even in the inner layer. In the case of adjusting the treating condition not to generate defect in the inner layer, reaction will be stopped in a state that the outer layer is fragmented, the fragmented substance of outer layer becomes carbon impurity, and electrical conductivity as an aggregate of carbon nanotubes becomes low. As an acid stronger in oxidizing power than nitric acid, a mixed acid consisting of concentrated nitric acid and concentrated sulfuric acid, fuming sulfuric acid and the like are listed. In comparison with these acids of very strong oxidizing power, it is thought that by heating nitric acid at a predetermined temperature, the outer layer of carbon nanotubes is moderately functionalized, amorphous carbon being carbon impurity and particulate carbon impurity are decomposed and removed, thereby to obtain aggregates of carbon nanotubes that electrical conductivity was improved.

The temperature that aggregates of double-walled carbon nanotubes are heated in a nitric solution may be any temperature as long as the aggregate of carbon nanotubes of the present invention is obtained, and it is preferably 70° C. or more, more preferably 80° C. or more, further preferably 90° C. or more, and most preferably, it is suitably set in a range from 100° C. to a temperature that a nitric acid solution becomes a refluxed state. In general, reflux temperature of nitric acid solution becomes high as the concentration of nitric acid is high. The lower the G/D ratio of the aggregate of double-walled carbon nanotubes to be used, the temperature is set to be lower, and the higher the G/D ratio, the temperature is set to be higher, thereby leading to easy preparation of a suitable amount in the level of functionalization.

The method of heating a nitric acid solution is not particularly limited as long as the aggregate of carbon nanotubes of the present invention is obtained, there are listed methods that a container in which a nitric acid solution was put is immersed and heated in an oil bath, water bath or sand bath; a container is wound with heating wire and heated; it is heated by direct fire and so on. From the point of efficiency, a state that the whole solution is uniformly heated is suitable. A nitric acid solution may be heated while stirring, or heated without stirring, from the point of efficiency, heating in a state that solution is being stirred is preferable. When not stirred, reaction time is suitably set to be longer than that when stirred.

The concentration of nitric acid in heating aggregates of double-walled carbon nanotubes in a nitric solution is preferably 10 weight % or more, more preferably 25 weight % or more, and further preferably, 30 weight % or more is suitable. It is suitable to use concentrated nitric acid of more preferably 55 weight % or more, and most preferably 60 weight % or more. The higher the concentration of nitric acid, the shorter the time necessary for decomposing carbon impurities by nitric acid becomes, and the shorter the time for functionalizing the surface of carbon nanotubes becomes.

Since nitric acid used here is to aim at functionalizing carbon nanotubes, it is preferable to adjust the concentration of nitric acid according to the G/D ratio of the aggregate of carbon nanotubes used. Ordinarily, an aggregate of carbon nanotubes of high G/D ratio is high in degree of graphitization, thus hardly subjected to functionalization. Therefore, by increasing the concentration of nitric acid when G/D ratio is high, the aggregate of carbon nanotubes of the present invention is easily obtained.

The time in heating aggregates of double-walled carbon nanotubes in a nitric solution is ordinarily adjusted by the concentration of nitric acid in a nitric acid solution and heating temperature, and the lower the concentration of nitric acid, the longer the time is set. When heating temperature is low, time is adjusted to be longer, and when heating temperature is high, time can be set to be shorter. The conditions of temperature and time in heating aggregates of carbon nanotubes in a nitric solution, concentration of nitric acid in a nitric solution and the like are adjusted as a hole so that the weight loss from 200° C. to 400° C. in thermogravimetry at a temperature rise of 10° C./min of the resulting aggregates of carbon nanotubes is from 5% to 20%.

Incidentally there is a case that a nitric acid solution is used generally for removing catalyst and catalyst support, in this case, so long as there is no special purpose, it is common that a condition not to damage graphene sheet or not to generate functionalization, specifically, a condition is made moderate such that the concentration of nitric acid is lowered. Just for removing catalyst and support, the removal can be sufficient only by heating with diluted nitric acid for a short time, in particular, in the case of aggregates of carbon nanotubes with high degree of graphitization, functionalization hardly occurs in such condition like this.

The method for producing an aggregate of double-walled carbon nanotubes is not limited, from the point that an aggregate of double-walled carbon nanotubes with high G/D ratio and high ratio of double-walled carbon nanotubes can be simply produced, for example, it can be produced as follows.

A powdery catalyst supporting iron on a support is contacted with a carbon-containing compound at 500 to 1200° C. in a reactor. For the reactor, any one may be used as long as the above-described aggregate of carbon nanotubes is obtained, but from the point that homogeneous aggregates of carbon nanotubes are obtained, it is preferable to use a vertical reactor. The vertical reactor means that it has a reactor disposed in the vertical direction (hereinafter, sometimes called "longitudinal direction"), from one end of the reactor toward the direction of other end, a carbon-containing compound is circulated, there is equipped a mechanism capable of circulation in a mode that the carbon-containing compound is passed through a catalyst layer formed with catalyst for producing carbon nanotubes. As the reactor, for example, a tubular reactor can be preferably used. Additionally, in the above description, a vertical direction includes a direction having some tilt angles to the vertical direction (for example, to a horizontal plane, 90°±15°, preferably 90°±10°). The most preferable one is the vertical direction. Additionally, supply part and discharge part of carbon-containing compound are not necessarily at the ends of a reactor, but only pass a carbon-containing compound through a catalyst layer in the circulation process.

The catalyst is preferably in a state that it is present in the whole area in the horizontal cross section direction of reactor in a vertical reactor. By doing so, the catalyst and a carbon-containing compound can be effectively contacted. In the case of a horizontal reactor, in order to make such state, a catalyst must be sandwiched from both sides against the attraction of gravity. However, in the case of production reaction of carbon nanotubes, carbon nanotubes are produced on the catalyst as the reaction proceeds and the volume of the catalyst increases, thus a method sandwiching catalyst from both sides is not preferable. In the present invention, by adopting a reactor of a vertical type and equipping a table that gas can transmit inside the reactor, and placing a catalyst thereon, thereby a catalyst can be uniformly present in the cross section direction of the reactor without sandwiching the catalyst from both sides. In the present invention, a state that a catalyst is present in the whole area in the horizontal cross section direction of a vertical reactor means a state that the catalyst is spread in the horizontal cross section direction overall, and the table at the bottom part of catalyst is not seen. The reactor is preferably heat-resistant, and one made of heat-resistant material such as quartz and alumina is preferable.

Carbon nanotubes are produced by passing a carbon-containing compound from the under part or upper part of a catalyst layer placed in a reactor and contacting a catalyst to react. The temperature of contacting a catalyst and a carbon-containing compound is 500 to 1200° C. The temperature is more preferably 600 to 950° C., and further preferably in a range of 700 to 900° C. When the temperature is too low, yield of carbon nanotubes becomes bad. When the temperature is too high, in addition to the restriction of material used in a reactor, carbon nanotubes set in agglomeration each other, and control of shape of carbon nanotubes becomes difficult. A reactor may be set to reaction temperature while a carbon-containing compound is contacted, or after completion of pretreatment by heat, reactor is set to reaction temperature, then supply of a carbon-containing compound may be started.

A support for supporting iron is preferably magnesia. By supporting iron as a catalyst on magnesia of a support, it is easy to control the particle diameter of iron, and even when ion is present in a high density, sintering hardly occurs under high temperature. Therefore, carbon nanotubes of high quality can be efficiently synthesized in abundance. Further, since magnesia is dissolved in an aqueous acidic solution, it is possible to remove both magnesia and iron only by treating with an aqueous acidic solution, thus a purification process can be simplified.

As for magnesia, commercial one may be used or one synthesized may be used. As a preferable method for producing magnesia, there are methods where magnesium metal is heated in air, magnesium hydroxide is heated at 850° C. or more, magnesium hydroxide carbonate $3MgCO_3.Mg(OH)_2.3H_2O$ is heated at 950° C. or more, and so on.

Iron to be supported on a catalyst is not limited to a zerovalent state. It can be assumed to be a zerovalent state during reaction, but widely it may be a compound containing iron or iron species. For example, there are used organic salts or inorganic salts such as iron formate, iron acetate, iron trifluoroacetate, iron ammonium citrate, iron nitrate, iron sulfate and iron halide; and complex salts such as an ethylenediaminetetraacetate complex and an acetylacetonate complex. Iron is preferably a fine particle. The particle diameter of a fine particle is preferably 0.5 to 10 nm. When iron is a fine particle, a carbon nanotube with a small outer diameter tends to be produced.

The method to support iron on magnesia is not particularly restricted. For example, there is used a method that magnesia is immersed in nonaqueous solution (for example, ethanol solution) or aqueous solution that salts of iron to be supported was dissolved, sufficiently dispersed and mixed by stirring or ultrasonic irradiation, then dried (immersion method). Further, iron may be supported on magnesia by heating at high temperature (300 to 1,000° C.) in a gas selected from air, oxygen, nitrogen, hydrogen, inert gas and mixed gas thereof, or in vacuum.

The more the supported amount of iron is, the higher the yield of carbon nanotubes is, but when too much, the particle diameter of iron becomes large, and the resulting carbon nanotube becomes thick. When the supported amount of iron is small, the particle diameter of iron to be supported becomes small, and a carbon nanotube with a small outer diameter and a relatively narrow distribution of outer diameter is obtained, but the yield tends to be lowered. The optimum supported amount of iron differs depending on the pore volume, outer surface area of magnesia and supporting method, it is preferable to support iron by 0.1 to 20 weight % relative to magnesia.

Before the reaction for producing carbon nanotubes, heat pretreatment of catalyst may be conducted. The time of heat pretreatment is not particularly limited, when too long, agglomeration of metal occurs on magnesia, in accordance with this, a carbon nanotube with a large outer diameter is sometimes produced, thus within 120 minutes is preferable.

The temperature of pretreatment may be lower than reaction temperature as long as catalyst activity is exhibited, may be the same as reaction temperature or higher than reaction temperature. Conducting heat pretreatment sometimes makes the catalyst a more active state. Heat pretreatment and reaction for producing carbon nanotubes are preferably conducted in reduced pressure or atmospheric pressure.

In the case that contact of a catalyst and a carbon-containing compound is conducted in reduced pressure, a reaction system can be depressurized by a vacuum pump or the like. In the case that pretreatment or reaction is conducted in atmospheric pressure, a mixed gas that a carbon-containing compound and a diluting gas were mixed may be contacted with a catalyst.

The diluting gas is not particularly limited, and one other than oxygen is preferably used. Oxygen is generally not used because of possibility of explosion, but it may be used outside the explosive range. As the diluting gas, nitrogen, argon, hydrogen, helium and the like are preferably used. These gases have effects on control of linear velocity and concentration of a carbon-containing compound, and as a carrier gas. Hydrogen is preferable because it has an effect on activation of catalyst metal. A gas of high molecular weight like argon has a large annealing effect, and it is preferable when annealing is targeted. In particular, nitrogen and argon are preferable.

The carbon-containing compound used is not particularly limited as long as an aggregate of double-walled carbon nanotubes with a high G/D ratio, and hydrocarbon or oxygen-containing carbon compound is preferably used. The hydrocarbon may be aromatic or nonaromatic. As an aromatic hydrocarbon, for example, there can be used benzene, toluene, xylene, cumene, ethylbenzene, diethylbenzene, trimethylbenzene, naphthalene, phenanthrene, anthracene, or a mixture thereof, and the like. As a nonaromatic hydrocarbon, for example, there can be used methane, ethane, propane, butane, pentane, hexane, heptane, ethylene, propylene, acetylene, or a mixture thereof, and the like. As the oxygen-containing carbon compound, for example, there can be alcohols such as methanol, ethanol, propanol and butanol; ketones such as acetone; aldehydes such as formaldehyde and acetaldehyde; ethers such as trioxane, dioxane, dimethyl ether and diethyl ether; esters such as ethyl acetate; carbon monoxide, and a mixture thereof. Among these, a compound selected from methane, ethane, ethylene, acetylene, propane and propylene is a preferable carbon-containing compound from the point that carbon nanotubes with a high purity are obtained. In particular, when methane is used, it is preferable because double-walled carbon nanotubes with high degree of graphitization are obtained. These are gas at ambient temperature and pressure, thus they are easily supplied to reaction by specifying the supply amount as gas. For other carbon-containing compounds, when reacted at ambient pressure, a step such as vaporization needs to be added.

When the thus produced composition of carbon nanotubes is subjected to oxidation treatment in a gas phase, single-walled carbon nanotubes and amorphous carbon are preferentially burnt and removed. Thereby, an aggregate of double-walled carbon nanotubes with high G/D ratio is obtained.

The oxidation treating method of carbon nanotubes in gas phase is a process that aggregates of carbon nanotubes are exposed under the presence of oxidizing gas. The oxidizing gas is not particularly limited as long as it shows an oxidizing property to aggregates of carbon nanotubes when aggregates of carbon nanotubes are exposed at treating temperature, and carbon monoxide, carbon dioxide, ozone, oxygen, air or the like is listed. The composition of gas may be a mixed gas of these gases, or may be a gas mixed with other gas not showing an oxidizing property to aggregates of carbon nanotubes (inert gas).

In the oxidation treatment in a gas phase, when burning treatment is conducted at a much lower temperature than a combustion peak of carbon nanotubes, there are many cases that single-walled carbon nanotubes are not burnt and removed, thus it is preferably conducted at a temperature not less than a combustion peak temperature of carbon nanotubes −50° C. in differential thermal analysis of composition of carbon nanotubes. When a temperature corresponding to a skirt at the low temperature side of combustion peak temperature of carbon nanotubes in differential thermal analysis is not less than the combustion peak temperature −50° C., it is preferable to conduct oxidation treatment at a temperature not less than a temperature corresponding to a skirt at the low temperature side of combustion peak temperature of carbon nanotubes in differential thermal analysis. There are many cases that carbon nanotubes are ordinarily synthesized in a quartz tube as a reactor tube, in this case, the temperature of oxidation treatment is preferably 1200° C. or less, and more preferably, it is suitably conducted at 1,000° C. or less. In the case that oxidation treatment is conducted at a temperature exceeding 1200° C., it is desirable to choose a material of equipment used so as to be resistant thereto. When oxidation treatment is conducted at a temperature much higher than the combustion peak temperature of carbon nanotubes, in this time, all of the carbon nanotubes produced are burnt and lost. Hence, it is preferable to conduct oxidation treatment at around the combustion peak temperature of carbon nanotubes, and it is more preferable to conduct oxidation treatment at around the combustion peak temperature of carbon nanotubes ±25° C.

Oxidation treatment may be conducted in an electric furnace, or after synthesis of carbon nanotubes, it may be conducted in a rector whose inside is an air atmosphere or reduced in air concentration by inert gas. Oxidation treatment is carried out ordinarily by about 10 g when done in an electric furnace, and in the case of a small amount not reaching that, it is carried out by a possible amount. The time of oxidation treatment is not particularly restricted. Generally, it is preferably done between 1 hour and 10 hours.

The confirmation of the number of layers in carbon nanotube after this oxidation treatment may be conducted right after the synthesis of carbon nanotubes, or after another purification treatment. For example, in the case of using iron/magnesia as a catalyst, after oxidation treatment, purification treatment may be conducted with acid such as hydrochloric acid for further removing a catalyst, or firstly, purification treatment is conducted with an acid such as hydrochloric acid for removing a catalyst, then oxidation treatment may be conducted.

In the present invention, the thus obtained carbon nanotubes are preferably treated with nitric acid by a method described above.

EXAMPLES

Hereinafter, the present invention is specifically explained by Examples, but the following Examples are merely shown for exemplification, in any sense, are not used as limited interpretation of the present invention.

Example 1

(Catalyst Preparation) 2.459 g of iron ammonium citrate (green color) (manufactured by Wako Pure Chemical Industries Ltd.) was dissolve in 500 mL of methanol (manufactured by Kanto Chemical Co., Ltd.). To this solution, 100 g of light magnesia (manufactured by Iwatani Corporation, bulk density was 0.125 g/mL.) was added, stirred at room temperature for 60 minutes, while it was stirred from 40° C. to 60° C., methanol was removed by drying under reduced pressure, obtaining a catalyst that a metal salt was supported on light magnesia powder.

(Production of Aggregate of Carbon Nanotubes)

Carbon nanotubes were synthesized by a fluid bed vertical reactor shown in FIG. 1. A reactor 100 is a cylindrical quartz tube of 32 mm in inner diameter and 1200 mm in length. A quartz sintered plate 101 is equipped in the center part, an inert gas and raw gas supply line 104 in the under part, and a waste gas line 105 and a catalyst input line 103 in the upper part are equipped. Further, in order to hold a reactor at an arbitrary temperature, a heater 106 surrounding the circumference of the reactor is equipped. To the heater 106, an inspection port 107 is equipped so that a fluid state inside equipment can be confirmed.

12 g of catalyst was weighed out, passing through the catalyst input line 103 from a sealed feeder of catalyst 102, the catalyst 108 adjusted above was set on the quartz sintered plate 101. Subsequently, from the raw gas supply line 104, argon gas was begun to supply at 1,000 mL/mn. After inside of the reactor was under argon atmosphere, it was heated to a temperature of 850° C. (heat-up time: 30 minutes).

After reaching 850° C., the temperature was maintained, flow rate of argon in the raw gas supply line 104 was increased to 2,000 mL/min, fluidization of catalyst on the quartz sintered plate was started. After fluidization of catalyst was confirmed from the furnace inspection port 107, methane was mixed in argon for the flow rate of methane to be 95 mL/min (methane concentration: 4.5 vol %), and began to supply into the reactor. After the mixed gas was supplied for 90 minutes, it was changed to circulation of argon gas alone, and synthesis was completed. Heating was stopped, allowed to stand till it became room temperature, after it became room temperature, a composition of carbon nanotubes containing the catalyst and carbon nanotubes was taken out from the reactor.

About 10 mg of the composition of carbon nanotubes containing the catalyst was placed in a differential thermal analyzer (manufactured by Shimadzu Corporation, TGA-60), in air, temperature was raised from room temperature to 900° C. at a rate of temperature rise of 10° C./min. Weight change was then measured. At that point, a combustion peak temperature due to exothermic heat was read from the DTA curve to find 456° C.

23.4 g of the above-described composition of carbon nanotubes containing the catalyst was weighed in a porcelain dish (150φ), heated in air at 446° C. for 2 hours in an electric furnace previously heated up to 446° C. (manufactured by Yamato Scientific Co., Ltd., FP41), then taken out from the electric furnace. Next, for removing the catalyst, the composition of carbon nanotubes was added to a 6 N aqueous hydrochloric acid solution, and stirred at room temperature for 1 hour. The recovered material obtained by filtration was further added to a 6 N aqueous hydrochloric acid solution, and stirred at room temperature for 1 hour. This was filtered, washed with water several times, then the filtration residue was dried overnight in an oven of 120° C., and aggregates of carbon nanotubes that catalyst was removed were able to be obtained by 57.1 mg. The above-described process was repeated to supply to the following process.

On the other hand, in order to examine the amount of carbon lost in the electric furnace, 5.2 g of composition of carbon nanotubes containing catalyst not heated in an electric furnace was added to a 6 N aqueous hydrochloric acid solution, and stirred at room temperature for 1 hour. The recovered material obtained by filtration was further added to a 6 N aqueous hydrochloric acid solution, and stirred at room temperature for 1 hour. This was filtered, washed with water several times, then the filtration residue was dried overnight in an oven of 120° C., and aggregates of carbon nanotubes were obtained by 107.2 mg.

When calculated on the basis of this, the lost amount of carbon in the electric furnace was 88%. The thus obtained aggregates of carbon nanotubes were observed by a high-resolution transmission electron microscope, and the carbon nanotube was constituted by a beautiful graphite layer, and carbon nanotube with the number of layers by 2 was observed. Out of 100 pieces of carbon nanotubes observed, 84 pieces were occupied by double-walled carbon nanotubes. As a result of Raman spectroscopic analysis of wavelength 633 nm for this aggregate of double-walled carbon nanotubes, the G/D ratio was 75.

Next, 80 mg of the aggregate of double-walled carbon nanotubes that the above-described catalyst was removed was added to 27 mL of concentrated nitric acid (manufactured by Wako Pure Chemical Industries Ltd., first grade, Assay 60 to 61%), and heated in an oil bath of 130° C. for 5 hours while stirring. After completion of heating and stirring, a nitric acid solution including carbon nanotubes was filtered, washed with distilled water, then dried overnight at 120° C., obtaining 57 mg of aggregates of carbon nanotubes.

(Measurement of Volume Resistivity)

20 mg of the aggregates of carbon nanotubes obtained above was mixed with 16 mL of N-methylpyrrolidone, and subjected to ultrasonic irradiation for 20 minutes at 20 W using an ultrasonic homogenizer. Thereafter, the mixture was mixed with 10 mL of ethanol, and subjected to suction filtration by membrane filter using a filter of inner diameter of 35 mmφ. The filtered material was dried in a drier at 60° C. for 2 hours together with the filter and membrane filter. The membrane filter attached with a film of carbon nanotubes was taken out from the filter, film thickness together with the membrane filter was measured, from which the film thickness of membrane filter was subtracted to find that the thickness of the film of carbon nanotubes was 55.7 µm. As the membrane filter, OMNIPORE MEMBRANE FILTERS, FILTER TYPE: 1.0 µm JA, 47 mmφ was used. The surface resistance of the film of carbon nanotubes obtained was measured by a 4-terminal 4-probe method in accordance with JISK7149 using Loresta EP MCP-T-360 (manufactured by Dia Instruments co., Ltd.) to find 0.134 Ω/□. Therefore, the volume resistivity is $7.5 \times 10^{-4}$ Ω·cm.

(Evaluation on the Number of Layers of Carbon Nanotube by Transmission Electron Microscope)

Figure 3:
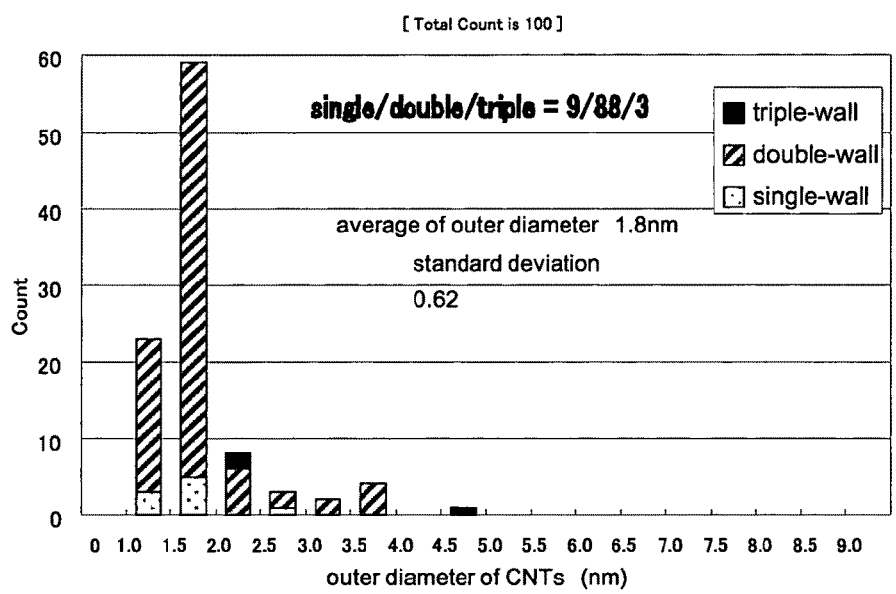
FIG. 3 describes the result evaluated by a transmission electron microscope for distributions of the outer diameter and the number of layers of the aggregate of carbon nanotubes produced in Example 1, and the average of outer diameter and the standard deviation in that case.

0.5 mg of aggregates of carbon nanotubes produced in production of the above-described aggregates of carbon nanotubes and 2 mL of ethanol were put in a 2 mL sample bottle, and subjected to ultrasonic irradiation for 15 minutes using an ultrasonic bath (use: ULTRASONIC CLEANER yamato 2510). An ethanol solution that carbon nanotubes were dispersed was added dropwise on micro-grid (STEM 150 Cu grid, carbon-reinforced, grid pitch of 150 µm) and dried. The grid coated with a sample in this way was placed in a transmission electron microscope (manufactured by JEOL Corporation, JEM-2100) and measurement was carried out. It was done by a measuring magnification of 400,000 times. The acceleration voltage is 100 kV. From the measured image, the number of layers and the diameter of 100 pieces of carbon nanotubes were measured. The result is shown in FIG. 3. The average of diameter of 100 pieces of carbon nanotubes was 1.8 nm, and the standard deviation of diameter was 0.62 nm. 88 pieces out of 100 pieces were double-walled carbon nanotubes.

(Measurement of Weight Loss from 200° C. to 400° C.)

About 1 mg of aggregates of carbon nanotubes produced in production of the above-described aggregates of carbon nanotubes was placed in a differential thermal analyzer (manufactured by Shimadzu Corporation, TGA-60), in air, temperature was raised from room temperature to 900° C. at a rate of temperature rise of 10° C./min. In that time, the weight loss from 200° C. to 400° C. was 9%. In this case, the largest peak in the DTA curve was 695° C.

(Evaluation of Transparent Conductivity)

In a container, 20.0 mg of aggregates of carbon nanotubes produced in production of the above-described aggregates of carbon nanotubes and 200 μL of ammonium polystyrene sulfonate aqueous solution (manufactured by Aldrich Corporation, 30 weight %, weight-average molecular weight of 200,000, measured by GPC, in terms of polystyrene) were put, and 9.80 mL of distilled water was added thereto. The mixture was subjected to dispersion treatment under ice cooling for 20 minutes at an output power of 20 W using an ultrasonic homogenizer to prepare a dispersion liquid of carbon nanotubes. In the liquid prepared, no agglomerated material was able to be confirmed by eye, and the aggregate of carbon nanotubes was well dispersed. The liquid obtained was centrifuged at 10,000 G for 15 minutes using a high-speed centrifugal machine, and 9 mL of the supernatant was obtained. In this time, 1 mL of residual liquid was filtrated using a filter of 1 μm in pore diameter and washed, the thus obtained filtration residue was dried at 120° C. by a drier. The weight of the filtration residue was measured to find 3.0 mg. Hence, it was know that 17.0 mg of carbon nanotubes was dispersed in 9 mL of the supernatant. Therefore, the concentration of carbon nanotubes in the supernatant is 0.18 weight %.

Figure 2:
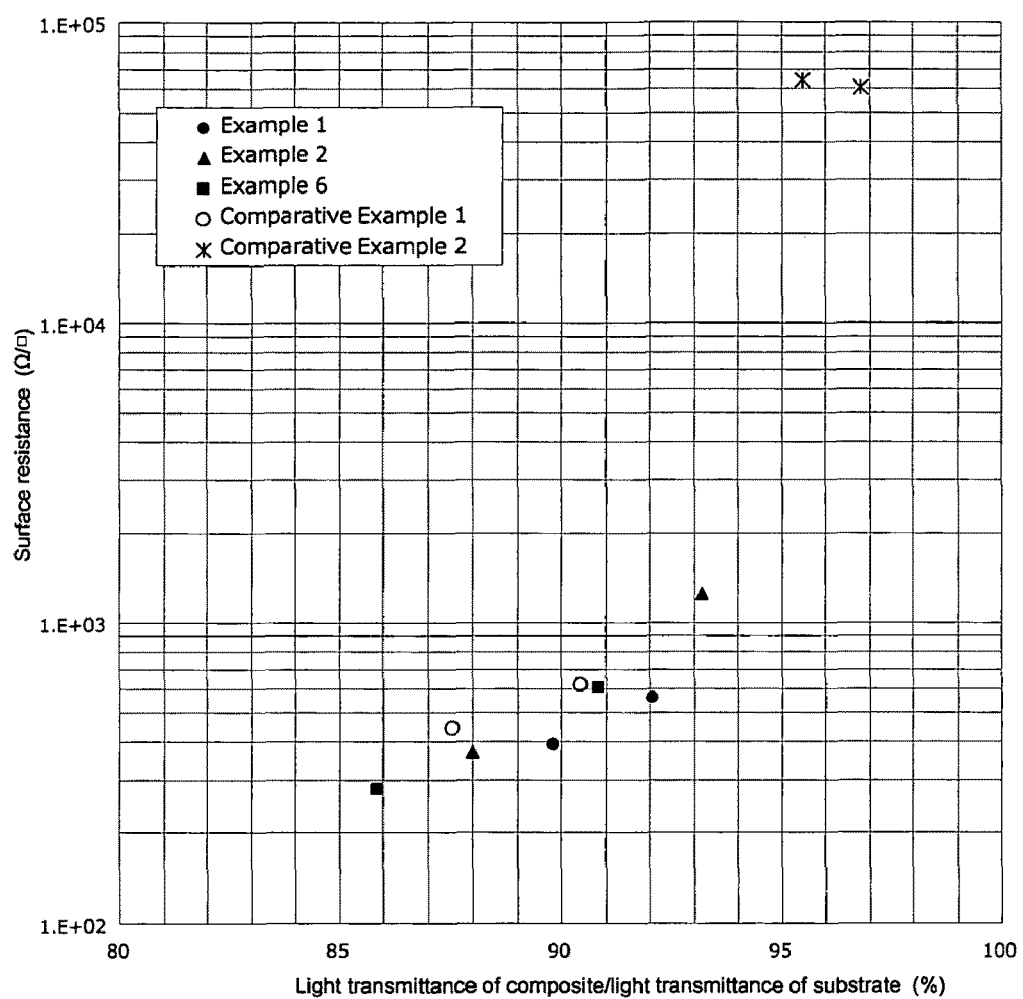
FIG. 2 is a figure showing the result of evaluation on transparent conductivity in Example 1, Example 2 and Example 6.

To 1 mL of the dispersion liquid of carbon nanotubes obtained, distilled water was added so that the concentration of carbon nanotubes was 0.09 weight %, and applied to a polyethylene terephthalate (PET) film (manufactured by Toray Industries Inc., "Lumirror (trademark) U46, " light transmittance of 90.6%, 15 cm×10 cm) using a bar coater (No. 3 and No. 5), air-dried, then rinsed with distilled water, and dried at 120° C. in an drier for 2 minutes. In this way, the composition of carbon nanotubes was fixed on the PET film, thereby to obtain a composite. The surface resistance of the composite was measured using a 4-terminal 4-probe method in accordance with JISK7149 by Loresta EP MCP-T-360 (manufactured by Dia Instruments Co., Ltd.). The light transmittance was measured by U-2001 model double beam spectrophotometer (manufactured by Hitachi, Ltd.) using 550 nm light. The result is shown in FIG. 2.

(XPS Measurement)

Figure 4:
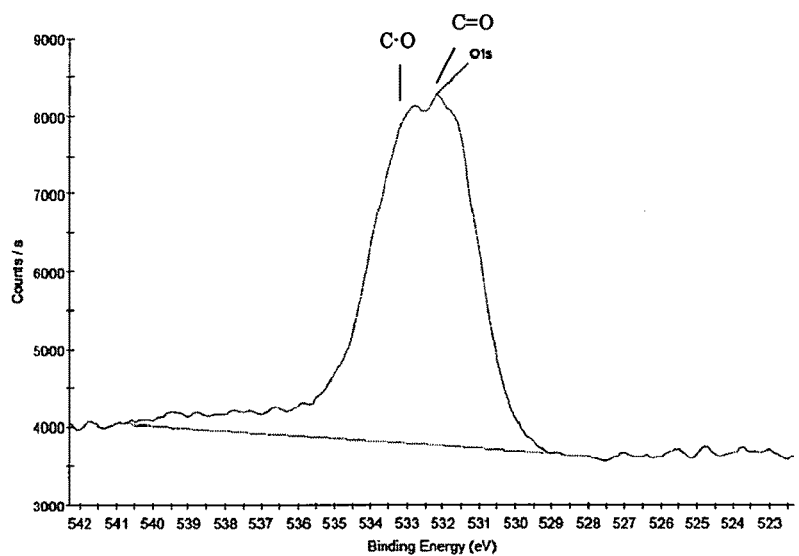
FIG. 4 is a diagram showing Binding Energy (eV) of O1s as the result from XPS measurement of the aggregate of carbon nanotubes in Example 1.

The aggregate of carbon nanotubes produced as above was measured using XPS. The result of analysis on surface composition (atomic%) was C; 94.4%, N; 0.2% and O; 5.1%. Hence, the ratio of oxygen atoms to carbon atoms in carbon nanotubes was 5.4% (atomic %). XPS measurement was done in the conditions; excited X-ray: Monochromatic Al $K_{1,2}$ ray, X-ray diameter: 1,000 photoelectron escaping angle: 90° (tilt of detector to sample surface). Presence of C—O group and C=O group can be determined from Binding Energy (eV) of O1s. The result is shown in FIG. 4.

(Measurement of Length of Carbon Nanotube)

The dispersion liquid prepared for evaluation of the above-described transparent conductivity was diluted with distilled water by 70 times, and applied to mica by a bar coater (No. 3).

After drying at 120° C. for 2 minutes, length of carbon nanotube was measured by AFM. As a result, the average length of 25 pieces was 1.8

Example 2

(Catalyst Preparation)

A catalyst was prepared in the same manner as Example 1.

(Production of Aggregate of Carbon Nanotubes)

Production of aggregate of carbon nanotubes was conducted in the same manner as Example 1. However, after heating in concentrated nitric acid, further, burning was conducted in air by an electric furnace at a temperature of 400° C. The aggregate of carbon nanotubes obtained was measured in the same manner as Example 1.

(Measurement of Volume Resistivity)

The volume resistivity was $5.0 \times 10^{-3}$ Ω·cm.

(Evaluation on the Number of Layers of Carbon Nanotube by Transmission Electron Microscope)

The average of diameter of 100 pieces of carbon nanotubes was 1.8 nm, and the standard deviation of diameter was 0.64 nm. 90 pieces out of 100 pieces were double-walled carbon nanotubes.

(Measurement of weight Loss from 200° C. to 400° C.)

The weight loss from 200° C. to 400° C. was 5.6%. In this time, the largest peak in the DTA curve was 773° C.

(Evaluation of Transparent Conductivity)

The transparent conductivity of composite was evaluated in the same manner as Example 1. The result is shown in FIG. 2.

Example 3

(Catalyst Preparation)

A catalyst was prepared in the same manner as Example 1 except that the use amount of iron ammonium citrate (green color) (manufactured by Wako Pure Chemical Industries Ltd.) was 3.279 g, as light magnesia, one manufactured by Wako Pure Chemical Industries Ltd. (bulk density was 0.16 g/mL,) was used.

(Production of Aggregate of Carbon Nanotubes)

Aggregates of carbon nanotubes were produced in the same manner as Example 1 except that burning temperature in an electric furnace was set to 400° C. The aggregate of carbon nanotubes obtained was measured in the same manner as Example 1.

(Measurement of Volume Resistivity)

The volume resistivity was $2.7 \times 10^{-3}$ Ω·cm.

(Evaluation on the Number of Layers of Carbon Nanotube by Transmission Electron Microscope)

The average of diameter of 100 pieces of carbon nanotubes was 1.8 nm, and the standard deviation of diameter was 0.79 nm. 85 pieces out of 100 pieces were double-walled carbon nanotubes.

(Measurement of Weight loss from 200° C. to 400° C.)

The weight loss from 200° C. to 400° C. was 12.0%. In this time, the largest peak in the DTA curve was 599° C.

(G/D Ratio of Aggregate of Double-Walled Carbon Nanotubes before Heating in Nitric Solution)

The measurement result of Raman spectroscopic analysis of wavelength 633 nm was 20.01.

Example 4

(Catalyst Preparation)

A catalyst was prepared in the same manner as Example 1

(Production of Aggregate of Carbon Nanotubes)

Aggregates of carbon nanotubes were produced in the same manner as Example 1 except that 2 hours in burning by an electric furnace was changed to 1 hour. The aggregate of carbon nanotubes obtained was measured in the same manner as Example 1.

(Measurement of Volume Resistivity)

The volume resistivity was $1.5 \times 10^{-3}$ Ω·cm.

(Evaluation on the Number of Layers of Carbon Nanotube by Transmission Electron Microscope)

The average of diameter of 100 pieces of carbon nanotubes was 2.0 nm, and the standard deviation of diameter was 1.05 nm. 83 pieces out of 100 pieces were double-walled carbon nanotubes.

(Measurement of Weight Loss from 200° C. to 400° C.)

The weight loss from 200° C. to 400° C. was 11.0%. In this time, the largest peak in the DTA curve was 624° C.

(G/D Ratio of Aggregate of Double-Walled Carbon Nanotubes before Heating in Nitric Solution)

The measurement result of Raman spectroscopic analysis of wavelength 633 nm was 32.

Example 5

(Catalyst Preparation)

A catalyst was prepared in the same manner as Example 1

(Production of Aggregate of Carbon Nanotubes)

Aggregates of carbon nanotubes were produced in the same manner as Example 1 except that supply time of mixed gas of methane with argon was set to 30 minutes. The aggregate of carbon nanotubes obtained was measured in the same manner as Example 1.

(Measurement of Volume Resistivity)

The volume resistivity was $2.4 \times 10^{-3}$ Ω·cm.

(Evaluation on the Number of Layers of Carbon Nanotube by Transmission Electron Microscope)

The average of diameter of 100 pieces of carbon nanotubes was 1.8 nm, and the standard deviation of diameter was 0.54 nm. 90 pieces out of 100 pieces were double-walled carbon nanotubes.

(Measurement of Weight Loss from 200° C. to 400° C.)

The weight loss from 200° C. to 400° C. was 12.0%. In this time, the largest peak in the DTA curve was 611° C.

(G/D Ratio of Aggregate of Double-Walled Carbon Nanotubes before Heating in Nitric Solution)

The measurement result of Raman spectroscopic analysis of wavelength 633 nm was 45.

Example 6

An example using carbon nanotubes synthesized in a fixed bed vertical reactor is shown.

(Catalyst Preparation)

3.279 g of iron ammonium citrate (green color) (manufactured by Wako Pure Chemical Industries Ltd.) was dissolve in 500 mL of methanol (manufactured by Kanto Chemical Co., Ltd.). To this solution, 100 g of light magnesia (manufactured by Wako Pure Chemical Industries Ltd., bulk density was 0.16 g/mL.) was added, stirred at room temperature for 60 minutes, while it was stirred from 40° C. to 60° C., methanol was removed by drying under reduced pressure, obtaining a catalyst that metal salt was supported on light magnesia powder.

(Production of Aggregate of Carbon Nanotubes)

Figure 5:
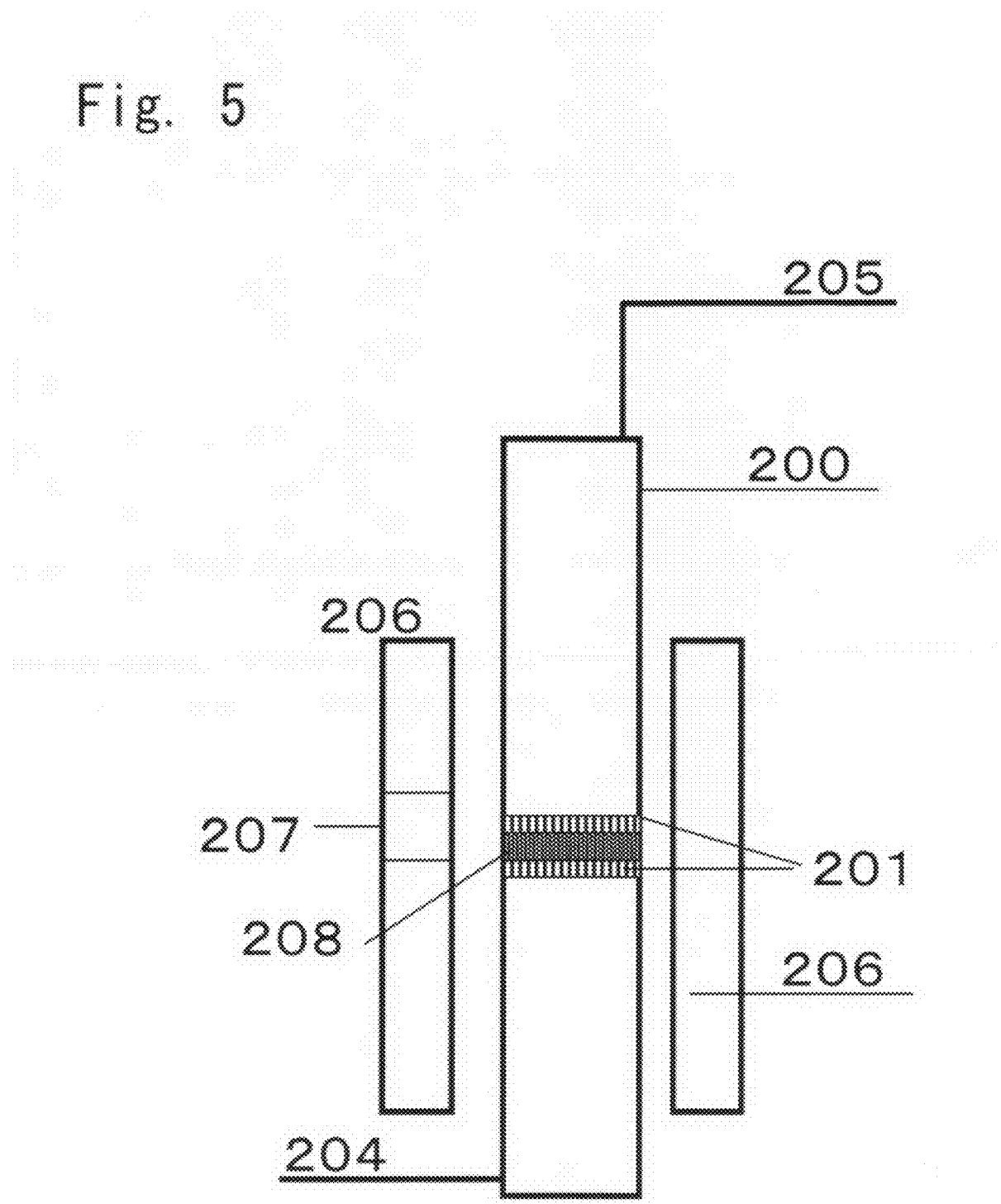
FIG. 5 is a schematic diagram of the fixed bed vertical reactor used in production of the aggregate of carbon nanotubes of Example 5.

Carbon nanotubes were produced by a fixed bed vertical reactor shown in FIG. 5. A reactor 200 is a cylindrical quartz tube of an inner diameter of 250 mm. The center part is made so that non-woven fabric carrying a catalyst can be disposed, the inert gas and raw gas supply line 204 in the under part, and the waste gas line 205 in the upper part are equipped. The upper part of the quartz tube is made openable and closable so that the catalyst 208 can be input. The lower part of the quartz tube is made openable and closable so that the catalyst 208 can be taken out. Further, in order to hold a reactor at an arbitrary temperature, the heater 206 surrounding the circumference of the reactor is equipped. To the heater 206, the inspection port 207 is equipped so that a state of the catalyst 208 inside equipment can be confirmed.

The reactor 200 was previously filled with argon before charging a catalyst. The heater 206 was heated at 850° C. before charging a catalyst. 10 g of the catalyst obtained by the above-described catalyst preparation was set between the non-woven fabrics 201 of a reactor shown in FIG. 5 and placed in the reactor 200. Thereafter, the equipment was operated, from the raw material supply line 204, argon gas was begun to supply at 50,000 mL/min. While a reaction room was replaced with argon, the catalyst was heated for 5 minutes, thereafter it was heated to a temperature of 870° C. (heat-up time: 30 minutes).

After reaching 870° C., the temperature was maintained, the flow rate of argon in the raw gas supply line 204 was set to 3,000 mL/min, further, methane was mixed so that the flow rate of methane was 140 mL/min, and began to supply into the reactor. After the mixed gas was supplied for 30 minutes, it was changed to circulation of argon gas alone, and synthesis was completed. Heating was stopped, allowed to stand till it became room temperature, after it became room temperature, a composition of carbon nanotubes containing the catalyst and carbon nanotubes was taken out from the reactor.

About 10 mg of the composition of carbon nanotubes containing the catalyst was placed in a differential thermal analyzer (manufactured by Shimadzu Corporation, TGA-60), in air, the temperature was raised from room temperature to 900° C. at a rate of temperature rise of 10° C./min. Weight change was then measured. At that point, a combustion peak temperature due to exothermic heat was read from the DTA curve to find 515° C.

20.0 g of the above-described composition of carbon nanotubes containing the catalyst was weighed in a porcelain dish (150φ), heated in air at 505° C. for 2 hours in an electric furnace previously heated up to 505° C. (manufactured by Yamato Scientific Co., Ltd., FP41), then taken out from the electric furnace. Next, for removing the catalyst, the composition of carbon nanotubes was added to a 6 N aqueous hydrochloric acid solution, and stirred at room temperature for 1 hour. The recovered material obtained by filtration was further added to a 6N aqueous hydrochloric acid solution, and stirred at room temperature for 1 hour. This was filtered, washed with water several times, then the filtration residue was dried overnight in an oven of 120° C., and 92.2 mg of aggregates of carbon nanotubes that catalyst was removed were able to be obtained.

The aggregate of carbon nanotubes obtained in this way was observed by a high-resolution transmission electron microscope, and out of 100 pieces of carbon nanotubes observed, 90 pieces were occupied by double-walled carbon nanotubes. In this case, as a result of Raman spectroscopic analysis of wavelength 633 nm for the aggregate of carbon nanotubes, the G/D ratio was 54.

Heat treatment in nitric acid was conducted in the same manner as Example 1 except that the above-described aggregate of carbon nanotubes was used, and heating time in concentrated nitric acid was set to 12 hours. The aggregate of carbon nanotubes obtained was measured in the same manner as Example 1.

(Measurement of Volume Resistivity)

The volume resistivity of the aggregate of carbon nanotubes was $2.4 \times 10^{-3}$ Ω·cm.

(Evaluation on the Number of Layers of Carbon Nanotube by Transmission Electron Microscope)

The average of diameter in 100 pieces of carbon nanotubes was 1.9 nm, and the standard deviation of diameter was 0.71 nm. 82 pieces out of 100 pieces were double-walled carbon nanotubes.

(Measurement of Weight Loss from 200° C. to 400° C.)

The weight loss from 200° C. to 400° C. was 10.5%. In this time, the largest peak in the DTA curve was 700° C.

(Evaluation of Transparent Conductivity)

Transparent conductivity of composite was measured in the same manner as Example 1. The result is shown in FIG. 2.

Comparative Example 1

The aggregate of carbon nanotubes produced in Example 1 was burnt in air by an electric furnace at a temperature of 400° C. for 5 hours, thereby obtaining an aggregate of carbon nanotubes that the weight loss from 200° C. to 400° C. was 3.6%.

(Measurement of Volume Resistivity)

The volume resistivity of the aggregate of carbon nanotubes was measured in the same manner as Example 1 to find $1.9 \times 10^{-2}$ Ω·cm.

(Evaluation on the Number of Layers of Carbon Nanotube by Transmission Electron Microscope)

74 pieces out of 100 pieces were double-walled carbon nanotubes. The average of diameter in 100 pieces of carbon nanotubes was 1.9 nm, and the standard deviation of diameter was 0.60 nm.

(Evaluation of Transparent Conductivity)

Transparent conductivity of composite was measured in the same manner as Example 1. The result is shown in FIG. 2.

Comparative Example 2

Aggregates of carbon nanotubes manufactured by Meijo Nano Carbon Co., Ltd. (when evaluation on the number of layers was conducted in the same manner as Example 1, of 100 pieces of carbon nanotubes, 30 pieces were double-walled carbon nanotubes and 67 pieces were single-walled carbon nanotubes.) were heated in a nitric acid solution in the same manner as Example 1, then the volume resistivity was measured in the same manner as Example 1 to find $6.4 \times 10^{-3}$ Ω·cm.

(Evaluation of Transparent Conductivity)

Transparent conductivity of composite was measured in the same manner as Example 1. The result is shown in FIG. 2.

Comparative Example 3

80 mg of double-walled carbon nanotubes manufactured by Nanotechport Company (59 pieces out of 100 pieces were double-walled carbon nanotubes. In this point, the weight loss from 200° C. to 400° C. was 9.5%. Raman G/D ratio at a wavelength of 633 nm was 11.8.) was added to 27 mL of concentrated nitric acid (manufactured by Wako Pure Chemical Industries Ltd., first grade, Assay 60 to 61%), and heated in an oil bath of 130° C. for 5 hours while stirring, then it was treated in the same manner as Example 1. The volume resistivity was measured in the same manner as Example 1 to find $4.0 \times 10^{-2}$ Ω·cm. In this case, 58 pieces out of 100 pieces were double-walled carbon nanotubes. The weight loss from 200° C. to 400° C. was 10.4%.

INDUSTRIAL APPLICABILITY

A film having excellent light transmittance and surface resistance is obtained by using the aggregate of carbon nanotubes having excellent electrical conductivity of the present invention.

According to the production method of the present invention, an aggregate of carbon nanotubes having high electrical conductivity is obtained easily with high yield.

The invention claimed is:

1. An aggregate of carbon nanotubes satisfying all the following requirements (1) to (3):
    (1) the volume resistivity is from $1 \times 10^{-5}$ Ω·cm to $5 \times 10^{-3}$ Ω·cm;
    (2) at least 50 out of 100 carbon nanotubes are double-walled carbon nanotubes in observation by a transmission electron microscope; and
    (3) the weight loss from 200° C. to 400° C. in thermogravimetry at a temperature rise of 10° C./min is from 5% to 20%.

2. The aggregate of carbon nanotubes of claim 1, wherein the average of outer diameter of carbon nanotubes is in a range of 1.0 nm to 3.0 nm, and the standard deviation of outer diameter is 1.0 nm or less.

3. The aggregate of carbon nanotubes of claim 1, wherein the largest peak of a DTA curve in differential thermal analysis at a temperature rise of 10° C./min is in a range of 650° C. to 750° C.

4. The aggregate of carbon nanotubes of claim 1, wherein a C—O group and a C=O group are present in the carbon nanotubes.

5. The aggregate of carbon nanotubes of claim 1, wherein the ratio of oxygen atoms to carbon atoms in the carbon nanotubes is 4% or more.

6. A molded article of carbon nanotubes comprising the aggregate of carbon nanotubes of claim 1.

7. A composition containing the aggregate of carbon nanotubes of claim 1.

8. The composition of carbon nanotubes of claim 7, wherein the aggregate of carbon nanotubes is dispersed in a liquid dispersion medium.

9. A molded article comprising the composition of carbon nanotubes of claim 7.

10. A composite comprising a conductive layer containing the composition of carbon nanotubes of claim 1 formed on a substrate.

11. The composite of claim 10, wherein said substrate is a film.

12. The composite of claim 11 satisfying the following requirements of (1) and (2):
    (1) the surface resistance is less than $1 \times 10^4$ Ω/□;
    (2) the light transmittance of wavelength 550 nm satisfies the following requirement:
    light transmittance of composite/light transmittance of substrate $\geq 0.85$.

13. A method for producing the aggregate of carbon nanotubes of claim 1 by heating an aggregate of carbon nanotubes including double-walled carbon nanotubes of 20 or more in a height ratio of G band to D band (G/D ratio) by Raman spectroscopic analysis of wavelength 633 nm in a nitric acid solution.

14. The method for producing the aggregate of carbon nanotubes of claim 13, wherein temperature in heating in said nitric acid solution is 70° C. or more.

15. The method for producing the aggregate of carbon nanotubes of claim 13, wherein concentration of nitric acid in said nitric acid solution is 10 weight % or more.

16. The method for producing the aggregate of carbon nanotubes of claim 13, wherein the aggregate of carbon nanotubes including double-walled carbon nanotubes of 20 or more in said G/D ratio is one obtained in such manner that a composition of carbon nanotubes is produced by contacting a powdery catalyst supporting iron on magnesia and methane at 500-1200° C., and the composition of carbon nanotubes is subsequently subjected to oxidation treatment in a gas phase.

* * * * *